(12) United States Patent
Greene

(10) Patent No.: US 9,145,311 B2
(45) Date of Patent: Sep. 29, 2015

(54) APPARATUS FOR CONTROLLING AN ELECTROLYTIC CELL IN A WATER PURIFICATION SYSTEM

(71) Applicant: Anthony Elmer Greene, Yucca Valley, CA (US)

(72) Inventor: Anthony Elmer Greene, Yucca Valley, CA (US)

( * ) Notice: Subject to any disclaimer, the term of this patent is extended or adjusted under 35 U.S.C. 154(b) by 398 days.

(21) Appl. No.: 13/711,611

(22) Filed: Dec. 11, 2012

(65) Prior Publication Data

US 2014/0158525 A1    Jun. 12, 2014

(51) Int. Cl.
    *C02F 1/461*    (2006.01)
    *H02J 1/00*     (2006.01)
    *H02J 1/04*     (2006.01)

(52) U.S. Cl.
    CPC ............... *C02F 1/46104* (2013.01); *H02J 1/00* (2013.01); *H02J 1/04* (2013.01); *C02F 2201/46125* (2013.01); *C02F 2209/005* (2013.01); *C02F 2209/006* (2013.01); *C02F 2209/008* (2013.01); *Y02W 10/37* (2015.05)

(58) Field of Classification Search
    CPC ..................................... H02J 1/00; H02J 1/04
    USPC .................................................... 204/228.1
    See application file for complete search history.

(56) References Cited

U.S. PATENT DOCUMENTS

| | | | |
|---|---|---|---|
| 4,787,481 A | 11/1988 | Farrar et al. | |
| 7,034,582 B2 | 4/2006 | Jones et al. | |
| 7,385,357 B2 | 6/2008 | Kuennen et al. | |
| 7,579,793 B2 | 8/2009 | Fischer | |
| 8,101,053 B2 | 1/2012 | Adams | |
| 8,155,740 B2 | 4/2012 | Wanasek | |
| 8,156,608 B2 | 4/2012 | Field et al. | |
| 8,198,845 B2 | 6/2012 | Knoedgen | |
| 2009/0182469 A1 | 7/2009 | Tucker | |
| 2010/0010288 A1* | 1/2010 | Von Ohlsen et al. | 600/9 |
| 2011/0065161 A1 | 3/2011 | Kwasinski et al. | |
| 2011/0253639 A1 | 10/2011 | Kook et al. | |
| 2013/0126431 A1* | 5/2013 | Henson et al. | 210/638 |
| 2014/0091720 A1* | 4/2014 | Brinlee | 315/186 |

FOREIGN PATENT DOCUMENTS

WO    WO 2012125637 A2 *    9/2012

* cited by examiner

*Primary Examiner* — Nicholas A Smith

(57) ABSTRACT

A system comprises a water purification system having an electrolytic cell to receive a flow of waste water. A power source supplies power to the electrolytic cell. The power source at least comprises an H-bridge controller to apply power to the electrolytic cell. A device senses an amount of current being supplied to the H-bridge controller. An analog-to-digital device outputs a digital signal representative of the sensed current. A processor processes the digital signal and outputs a plurality of pulse width modulated control signals for the H-bridge controller. The control signals control the H-bridge controller to apply the power during a first period of time with a current in a first direction to maintain an average for the sensed current, and to apply the power during a second period of time with the current in a second direction to maintain the average.

21 Claims, 40 Drawing Sheets

| Part Designation | Part Description |
|---|---|
| U1, U2 | PIC16F887 44-pin microcontroller (TQFP surface mount) from Microchip |
| U3 | PIC16(L)F1825 14-pin microcontroller (SOIC surface mount from Microchip |
| U4 | TLC0820AIDW flash analog-to-digital convertor (SMT) from Texas Instruments |
| U5 | LM258AMX 8-pin dual op amp (SMT) from Fairchild Semiconductor) |
| U6, U16, U17 | L7805CV positive 5 volt regulator 1.5 Amp max output |
| U7 | LP2950-50LPRE3 Positive 5 volt regulator |
| U8 | MAX232ECPE+ RS-232 tranceiver |
| U11, U12, U13, U14, U15 | MOC8050M optocoupler with Darlington transistor output |
| CRES1, CRES2, CRES3 | Either 4MHz or 20 MHz ceramic resonator with built-in load capacitors (e.g. FCR4.0MC5) |
| C1, C2, C5, C6, C7, C8, C10, C12, C14, C15 | 0.1 uF Tantalum capacitor (> 12 volt) |
| C3, C4 | 10 uF Tantalum capacitor (> 20 volt) |
| C9, C11, C13 | 0.33 uF Tantalum capacitor (> 20 volt) |
| C16, C17 | 1 uF Tantalum capacitor (>= 6.3 volt) |
| C18, C19 | 1 uF Tantalum capacitor (>= 16 volt) |
| D1, D2, D3, D4, D5, D6, D7, D8, D9 | 2.4 volt 10 milliamp LED (e.g. TLHG4405) |
| D10, D11, D12 | Small signal Schottky diode (350 milliamp) (e.g. BAT48 model) |
| R1 | 470 Ohm 1/8 Watt resistor |
| R2, R3, R4, R5, R13, R14, R15 | 10k Ohm 1/8 Watt resistor |
| R6 | 470 Ohm 200 mW resistor array (bussed type) (e.g. 4610X-101-471LF) |
| R7 | 10k Ohm 1/8 Watt 0.01% wire-wound resistor |
| R8 | 100k Ohm 1/8 Watt 0.01% wire-wound resistor |
| R9 | 10k Ohm 1/4 Watt 0.01% wire-wound resistor |
| R10 | 2k Ohm 200 mW resistor array (5 resistors) 6-SIP (e.g. 4606X-101-202LF) |
| R11 | 1k Ohm 200 mW resistor array (5 resistors) 6-SIP (e.g. 4606X-101-102LF) |
| R12 | 0.01 Ohm 100 Watt current sense resistor (e.g. TGHGCR0100FE) NOTE: Use a large heat sink (e.g. 423K) and heat sink conpound. |
| J1, J2 | Modular RJ-11 type jack (e.g. 5555165-1) |
| J3, J6, J9 | 10-pin IDC header (e.g. AWH10G-0222-T-R) |
| J4 | 3-pin header (e.g. 0022280030) Molex |
| J5 | 6-pin header (e.g. PBC06SAAN) Sullin's Connector Solutions |
| J7 | 2-pin header (e.g. 3-641213-2) TE Connectivity |
| J8 | DB-9 connector (Female) (e.g. 1734354-1) TE Connectivity |
| S1, S2, S3, S4 | Normally-open pushbutton switch (e.g. TPA11CGPC004) |

```
1
2
3    HIGH ADC_RD            'HIGH on flash ADC RD pin
4    PAUSEUS 10                  'Delay 10 uSec
5    LOW  ADC_CS            'Activate flash ADC CS pin…always selected
6
7    PAUSE 5000
8
9    Start:
10   GOSUB SET_CAL_DEFAULTS
11   CYCLE_HBS:
12        GOSUB CYCLE_HB_A
13        GOSUB CYCLE_HB_B
14   GOTO CYCLE_HBS
15   END
16
17   SET_CAL_DEFAULTS:          'Subroutine SET_CAL_DEFAULTS
18   CAL_DATA_20A = $38                   'Default is $38
19   CAL_DATA_25A = $3D                   'Default is $3D
20   CAL_DATA_30A = $40                   'Default is $40
21   CAL_DATA_35A = $43                   'Default is $43
22   CAL_DATA_40A = $46                   'Default is $46
23   RETURN
24
25   GET_ADC_VAL:              'Subroutine GET_ADC_VAL
26   LOW ADC_RD                'LOW ON ADC RD PIN
27   PAUSEUS  2                'Delay 2 uSec
28   ADC_Val = ADC_PORT        'Capture ADC value from ADC 8-bit port
29   HIGH ADC_RD               'HIGH ON ADC RD PIN
30   RETURN
```

```
31   CYCLE_HB_A:                          'Subroutine CYCLE_HB_A
32       AHI = 1                          'Turn on H-Bridge A high side
33       LOOP1_HBA:
34       IF TIMER_PORT == 1 THEN GOTO EXIT_HBA
35               BLI = 1                  'Turn on H-Bridge B Low side
36               PAUSEUS   10             'Pause 10 uSec
37               GOSUB GET_ADC_VAL        'Read ADC from port
38               IF ADC_Val > CAL_DATA_30A THEN
39                   BLI = 0              'Turn off HB
40                   PAUSEUS   400        'Pause 400 uSec
41                   GOTO LOOP1_HBA
42               ENDIF
43       PAUSEUS 90                       'Pause 90 uSec
44       LOOP2_HBA:
45       IF TIMER_PORT == 1 THEN GOTO EXIT_HBA
46               GOSUB GET_ADC_VAL        'Read ADC from port
47               IF ADC_Val > CAL_DATA_25A THEN
48                   BLI = 0              'Turn off HB
49                   PAUSEUS       100        'PAUSE 100 uSec
50                   GOTO LOOP1_HBA
51               ELSEIF ADC_Val > CAL_DATA_20A THEN
52                   BLI = 0              'Turn off HB
53                   PAUSEUS       25     'Pause 25 uSec
54                   GOTO LOOP1_HBA
55               ENDIF
56       GOTO LOOP2_HBA
57       EXIT_HBA:
58           BLI = 0                      'Turn OFF H-bridge side B low side
59           AHI = 0                      'Turn OFF H-bridge side A high side
60   RETURN
```

```
61   CYCLE_HB_B:              'Subroutine CYCLE_HB_B
62        BHI = 1             'Turn on H-Bridge A high side
63   LOOP1_HBB:
64            IF TIMER_PORT == 0 THEN GOTO EXIT_HBB
65            ALI = 1                'Turn on H-Bridge B low side
66            PAUSEUS   10           'Pause 10 uSec
67            GOSUB GET_ADC_VAL      'Read ADC from port
68            IF ADC_Val > CAL_DATA_30A THEN
69                ALI = 0            'Turn off HB
70                PAUSEUS   400      'Pause 400 uSec
71                GOTO LOOP1_HBB
72            ENDIF
73        PAUSEUS 90                 'Pause 90 uSec
74   LOOP2_HBB:
75            IF TIMER_PORT == 0 THEN GOTO EXIT_HBB
76            GOSUB GET_ADC_VAL      'Read ADC from port
77            IF ADC_Val > CAL_DATA_25A THEN
78                ALI = 0            'Turn off HB
79                PAUSEUS      100   'PAUSE 100 uSec
80                GOTO LOOP1_HBB
81            ELSEIF ADC_Val > CAL_DATA_20A THEN
82                ALI = 0            'Turn off HB
83                PAUSEUS      25    'Pause 25 uSec
84                GOTO LOOP1_HBB
85            ENDIF
86        GOTO LOOP2_HBB
87   EXIT_HBB:
88            ALI = 0                'Turn OFF H-bridge side A low side
89            BHI = 0                'Turn OFF H-bridge side B high side
90   RETURN
```

APPARATUS FOR CONTROLLING AN ELECTROLYTIC CELL IN A WATER PURIFICATION SYSTEM

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to regulating power in electronic circuits. More particularly, one or more embodiments of the invention relate to regulating power to an electrolytic cell.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that an electrical network is an interconnection of electrical elements such as resistors, inductors, capacitors, transmission lines, voltage sources, current sources and switches. An electrical circuit is a special type of network, one that has a closed loop giving a return path for the current.

Typically, an H bridge is an electronic circuit that enables a voltage to be applied across a load in either direction. These circuits are often used in robotics and other applications to allow DC motors to run forwards and backwards. H bridges are available as integrated circuits, or can be built from discrete components.

Typically, an electrolytic cell is an electrochemical cell that undergoes a redox reaction when electrical energy is applied. It is most often used to decompose chemical compounds, in a process called electrolysis.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A illustrates an exemplary water purification system, and FIG. 3B illustrates an exemplary electrolytic cell, in accordance with an embodiment of the present invention;

FIG. 5A illustrates a schematic diagram for an exemplary input-output processor and joined components, and FIG. 5B illustrates a schematic diagram for an exemplary RS-232 transceiver interfacing with a communications connector, in accordance with an embodiment of the present invention;

FIG. 11 illustrates an exemplary component list for an exemplary power regulation system, in accordance with an embodiment of the present invention;

FIG. 16 illustrates exemplary software written for an exemplary processor in PICBASIC language in accordance with an embodiment of the present invention;

Figure 1:
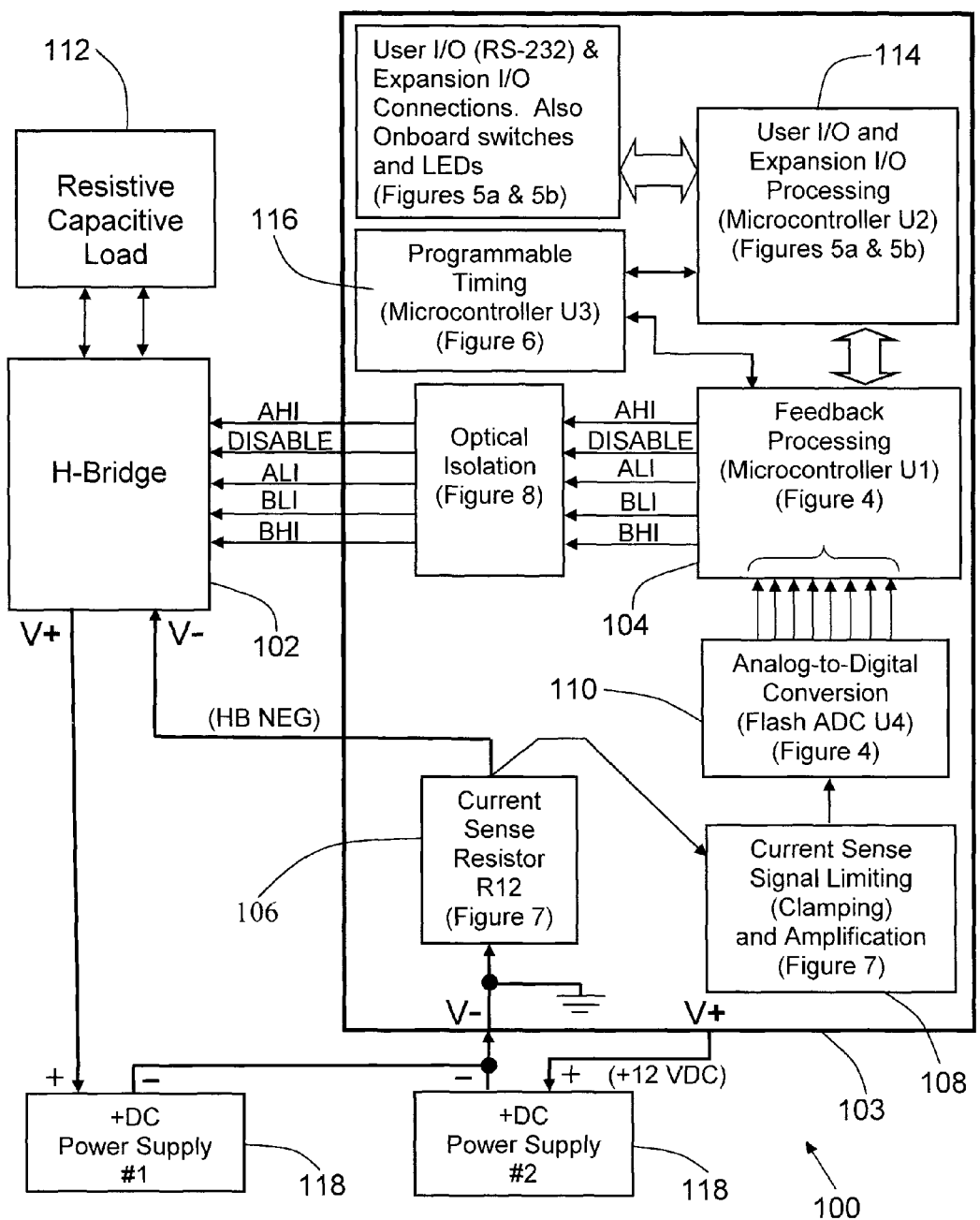
FIG. 1 illustrates a block diagram for a first possible embodiment of an exemplary power regulation system, in accordance with an embodiment of the present invention.

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

A non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; however, the non-transitory computer readable medium does not include a pure transitory signal per se.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

The present invention will now be described in detail with reference to embodiments thereof as illustrated in the accompanying drawings.

There are various types of power regulation systems and methods that regulate electric current into an electrolytic cell. In at least one embodiment of the present invention and variations thereof, the power regulation system may include a processor that regulates the direction of and average rate of an electric current in real-time based on the current sense feedback voltage. The processor may include software embedded into the power regulation system for controlling the regulation of power. In this manner, a circuit may not require hardware configuration to vary power requirements. In other embodiments, the software may control the power regulation system remotely from the processor. In some embodiments, the software may control the flow of current by indirectly controlling and regulating the current flow into an H-bridge circuit. The H-bridge circuit may enable a voltage to be applied across a resistive-capacitive load. In some embodiments, the resistive-capacitive load may include an electrolytic cell. However in other embodiments, the resistive-capacitive load may include, without limitation, an axial flow electrolytic cell, a group of electrolytic cells in series and/or parallel, a galvanized cell, and a battery. In one embodiment of the present invention, the electrolytic cell may include, without limitation, a water purification system. The water purification system may separate water into oxygen and hydrogen elements through the process of electrolysis from an external power source.

Those skilled in the art, in light of the present teaching, will recognize that the amount of electric current drawn by the electrolytic cell may vary depending on numerous factors. The power regulation system's capacity to change the direction of and to increase or decrease the rate of the electric current flowing into the electrolytic cell may be efficacious for conforming to various types of electrolyte solution, electrodes, and load requirements of the electrolytic cell. For example, without limitation, an electrolyte solution, including total dissolved solids in water, may affect the conductivity of the water flowing between a pair of electrodes in the electrolytic cell. The greater the conductivity of the electrolyte solution, the lower the resistance between the pair of electrodes, causing the average current to increase in the electrolytic cell. The increase in current flow may cause the power supply flowing through the H-bridge circuit to exceed maximum capacity, resulting in damage and power failures. In some embodiments, the power regulation system may allow the direction and rate of electric current flowing into the electrolytic cell to be based on real time, instantaneously processed samples of the current sense feedback voltage dropped across the current sense resistor. The real time processing, controlled by the software, may provide a more constant power source to the electrolytic cell.

FIG. 1 illustrates a block diagram for a first possible embodiment of an exemplary power regulation system 100, in accordance with an embodiment of the present invention. In the present embodiment, the power regulation system may include a fully programmable circuit board 103 with electronic hardware features that can be used by embedded software to process current sense feedback voltage in real-time for indirectly controlling and regulating the current flow into an H-bridge circuit 102 while the H-bridge circuit provides power to a resistive-capacitive load 112. In an alternative embodiment, as an alternative to using an H bridge to reverse direction of electric current, an arrangement of mechanical or electronic relays may be used; however, in that case, a transistor pass section and/or MOSFET pass section may be required and may be controlled by the processor in order to pulse-width modulate the average electric current flowing through the resistive-capacitive load. In one embodiment of the present invention, the power regulation system may include a processor 104 that regulates the direction and rate of the electric current flowing through an H bridge and through a resistive capacitive load in real-time. The processor may include software embedded into the power regulation system for controlling the regulation of power. In this manner, a circuit may not require hardware reconfiguration to vary power output and current regulation characteristics. In other embodiments, the software may control the power regulation system remotely from the processor. In some embodiments, the software may control the flow of electric current by indirectly controlling and regulating the electric current flow into an H-bridge circuit. The H-bridge circuit may enable a voltage to be applied across a resistive-capacitive load.

In one embodiment of the present invention, the power regulation system may include a processor. The processor may transmit a control signal to the H-bridge circuit. In this manner, current may flow through the H-bridge. In some embodiments, the current may flow through, and generate a voltage across a current sense resistor 106. In one embodiment, the voltage generated across the current sense resistor may pass into the current sense signal limiting and amplification device 108. In this manner, the current sense signal may be amplified. The amplified current sense signal may then be continually present at an input of a flash analog-to-digital converter (ADC) device 110. In one embodiment, the processor may read and process 8-bit parallel analog-to-digital conversion results from the flash ADC device by causing a LOW (logic 0) on an RD pin of the flash ADC device. Those skilled in the art, in light of the present teaching, will recognize that the conversion may take less than a microsecond after each time the RD pin is pulled LOW by the processor.

In one embodiment of the present invention, the software may adjust the output pulse widths of a plurality of pulse width modulation (PWM) pulses sent to the H-bridge circuit according to the amplitude of the voltage read from the flash ADC device by the processor. The flash ADC device performs an analog-to-digital conversion, converting the conditioned analog current sense feedback voltage into a binary, digital value that may be read into input-output port pins of a processor. The number of bits of resolution of the binary value may depend on the flash ADC device used. The flash ADC device may be used because it may have a faster conversion time, a faster access time, and a higher throughput than other types of ADC devices. The software may then run in a continuous loop, fetching results from the flash ADC device and adjusting the pulse width of each pulse sent to the H-bridge circuit. In this manner, the software may control the average current and, after a pre-programmed interval, the direction of the electric current through the H-bridge circuit and through the resistive-capacitive load driven by the H-bridge.

In one embodiment of the present invention, the power regulation system may include an input-output processor 114 that interfaces with the processor. The input-output processor may include a user input-output function and an expansion input-output function. The conjunction of the processor and the input-output processor may provide additional general purpose processing capacity. In some embodiments, the input-output processor may be programmed to handle customized input-output tasks such as interfacing the processor with external electronic devices. In one embodiment, a programmable timing processor 116 may be programmed and used for long term timekeeping functions. The timekeeping may include, without limitation, ninety seconds. Those skilled in the art, in light of the present teaching, will recognize that the timekeeping function of the timing processor may facilitate the software timing requirements of the processor and the input-output processor. The embedded software timing routines in the timing processor may be rapidly developed using a PAUSE( ) function and/or a PAUSEUS( ) function of a Basic language compiler, including, without limitation, PICBASIC. At least one power source 118 may provide power to the power regulation system. The at least one power source may include, without limitation, a D/C power supply, a battery, and/or a solar panel.

Figure 2:
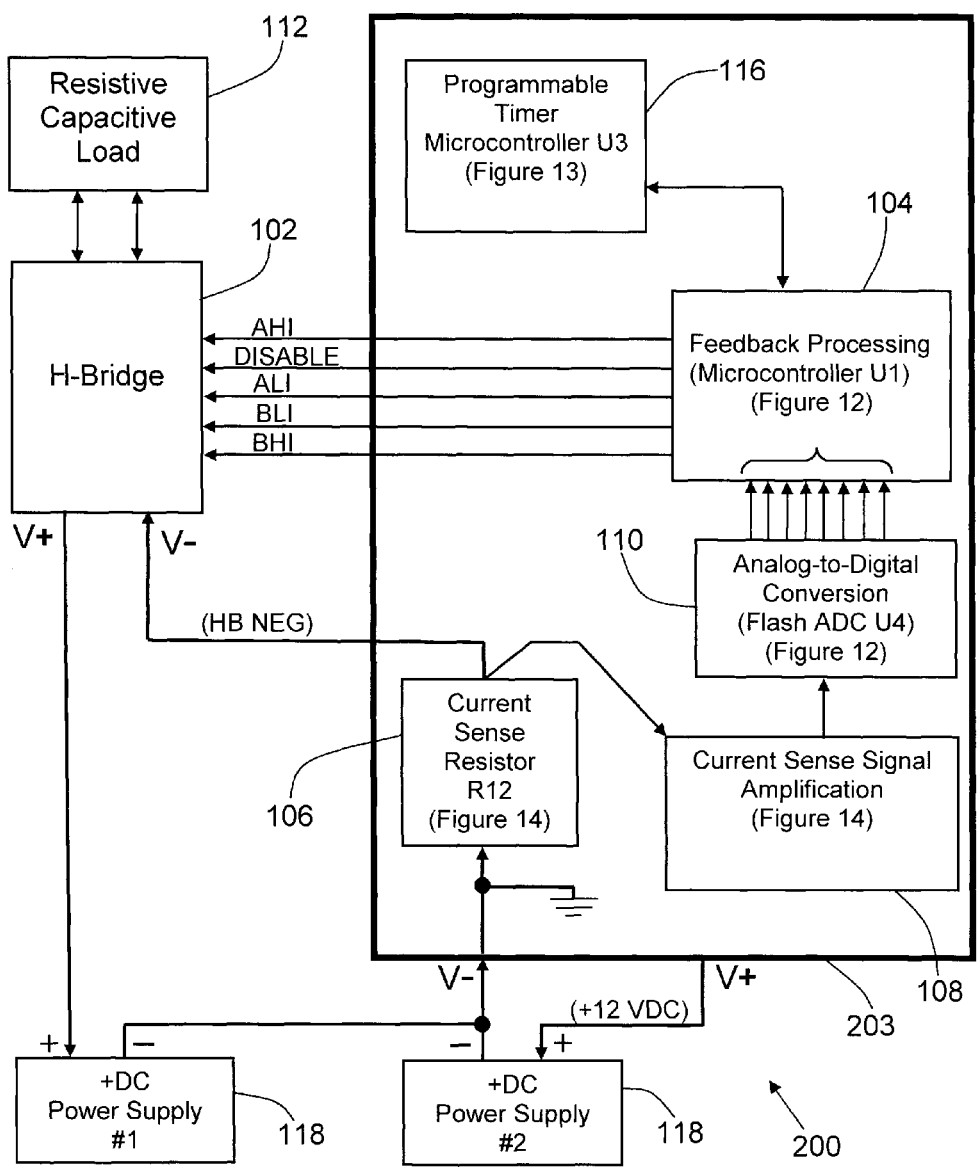
FIG. 2 illustrates a block diagram for a second possible embodiment of an exemplary power regulation system, in accordance with an embodiment of the present invention.

FIG. 2 illustrates a block diagram for a second possible embodiment of an exemplary power regulation system 200, in accordance with an embodiment of the present invention. In the present embodiment, the power regulation system may include a streamlined embodiment, wherein the input-output processor may not be included. In this manner, the additional general purpose processing capacity provided by the input-output processor may not be functional. In the present embodiment, the power regulation system may include a streamlined embodiment, wherein the optical isolation circuitry may not be included. In this manner, the H bridge control signal adjustments provided by the optical isolation circuitry may not be functional.

Figure 3A:
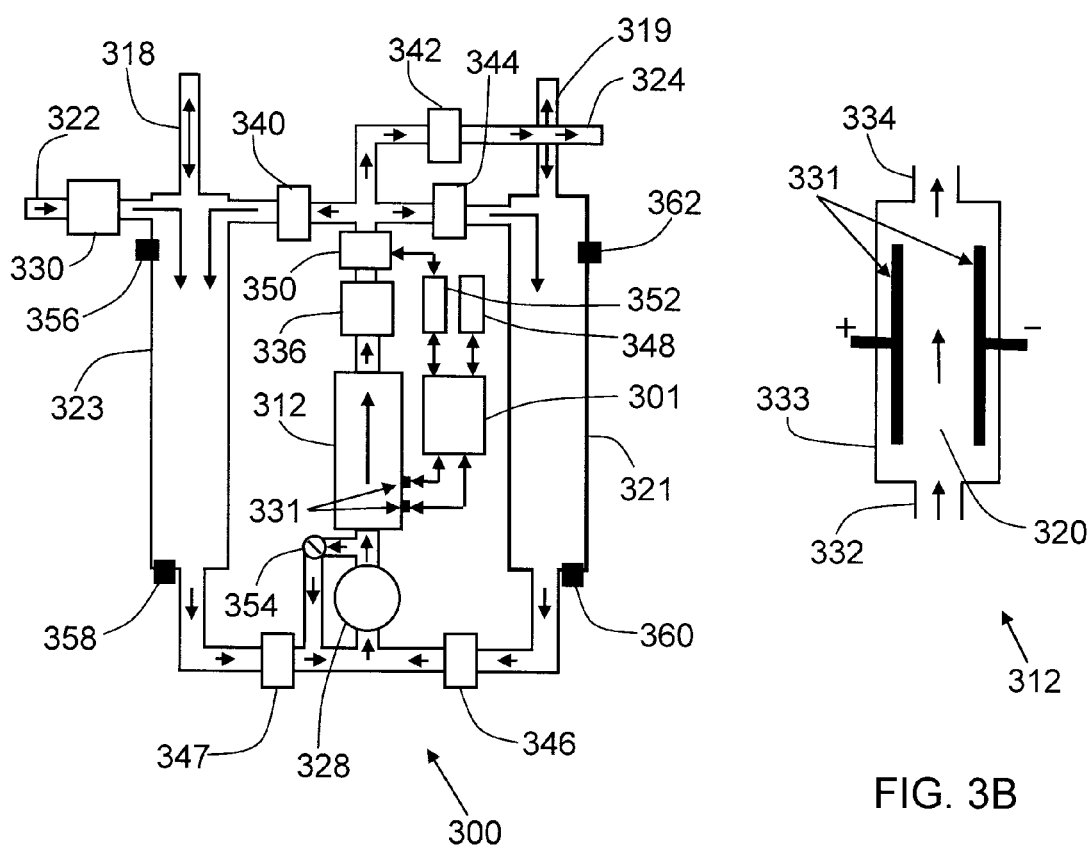
FIGS. 3A and 3B illustrate components for an exemplary water purification system, where
Figure 3B:
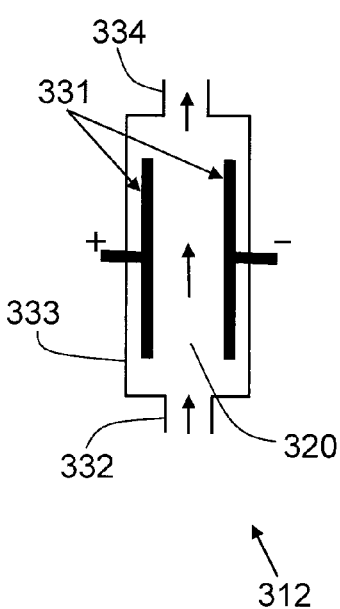

FIGS. 3A and 3B illustrate components for an exemplary water purification system, where FIG. 3A illustrates an exemplary water purification system, and FIG. 3B illustrates an exemplary electrolytic cell, in accordance with an embodiment of the present invention. In the present embodiment, the power regulation system may be a component of a system that uses electrolysis to process and purify water. The water purification system 300, which the power regulation system may be a component of, may also be used to generate ozone and/or hydrogen gas from water. However, in other embodiments, any separation of a solution may occur. In one embodiment, the specifications of the electronic and electrical components of the power regulation system may be improved to handle extreme climate temperatures. The power regulation system may provide electronic hardware features that the software may use to process current sense feedback voltage in real-time in order to indirectly control and regulate the electric current flow into the H-bridge circuit when the H-bridge circuit drives a resistive-capacitive load, such as an electrolytic cell. In some embodiments, exemplary water purification system 300's may be grouped in series and/or in parallel. Thus, the exemplary water purification system 300 may be scalable.

In one embodiment of the present invention, the water purification system 300 may utilize electrolysis to process waste water. The waste water may flow through an inlet portion 322 through at least one pre-filter 330 into at least one storage tank 323. The waste water may flow out of the at least one storage tank 323 through a valve 347 to a pump 328, which pumps the waste water through an electrolytic cell 312, and at least one post-filter 336. After the waste water flows through at least one post-filter 336, the waste water may flow through valve 340, valve 342, or valve 344. If the waste water flows through valve 340, the waste water may flow back into at least one storage tank 323 where it may again follow the flow path described previously. If the waste water flows through valve 344, the waste water may flow into at least one storage tank 321. The waste water may flow out of the at least one storage tank 321 through a valve 346 to a pump 328, which pumps the waste water through an electrolytic cell 312, and at least one post-filter 336. The waste water may be transferred back and forth between storage tank 323 and storage tank 321 through the flow paths described previously. Each time the waste water is transferred between storage tank 323 and storage tank 321, the waste water may pass through the electrolytic cell 312 and at least one filter 336 for further processing. This may result in the purity or quality of the water improving with each transfer between storage tank 323 and storage tank 321.

As waste water enters or exits each of the storage tanks, changes in air pressure within each of the tanks may occur as the waste water consumes more or less volume within each of the storage tanks Ventilation tubes 318 and 319 may allow air to flow into or out of the storage tanks in order to equalize the pressure within the storage tanks 323 and 321, respectively. Ventilation tubes 318 and 319 may also allow gases, for example, without limitation, hydrogen gas, generated as a result of the electrochemical reaction within the at least one electrolytic cell to be siphoned from the storage tanks 323 and 321 and to be transferred to an external gas storage device. In some embodiments, after the waste water flows through the post-filter 336, the waste water may not return to either of the storage tanks 323 or 321. Processed waste water may be taken out of the waste water purification system through a valve 342 and an outlet portion 324.

Valves 340, 342, 344, 346, 347, or pump 328 may be, for example, without limitation, electrically controlled, hydraulically controlled, or pneumatically controlled. If valves 340, 342, 344, 346, 347, or pump 328 are electrically controlled, electric current to valves 340, 342, 344, 346, 347, or pump 328 may be provided by DC driver board 348. DC driver board 348 may include Darlington driver IC chips and/or solid state relays and/or pulse-width modulation output circuitry. DC driver board 348 may be controlled via input/output expansion ports of the programmable circuit board 103 if power regulation system 301 may include a programmable circuit board 103. DC driver board 348 may be driven from an external controller, such as, without limitation, a personal computer, if the power regulation system 301 may include a programmable circuit board 203 which may have no available input-output expansion ports.

Sensors 356, 358, 360, and 362 are liquid level sensors. Additional liquid level sensors may be attached to storage tanks 323 and 321 in order to obtain more precise monitoring of the volumes of the liquid stored in each of the storage tanks 323 and 321 by the electronics. Sensor 356 may be used by the electronics to sense when storage tank 323 is full of liquid, whereas sensor 358 may be used by the electronics to sense when storage tank 323 is empty of liquid. Sensor 362 may be used by the electronics to sense when storage tank 321 is full of liquid, whereas sensor 360 may be used by the electronics to sense when storage tank 321 is empty of liquid. Although not shown in FIG. 3A, control signals from sensors 356, 358, 360, and 362 may be connected to a sensor interface circuit board 352. Sensor interface board 352 may include signal conditioning circuitry, operational amplifiers, and/or analog-to-digital convertors in order to convert the sensor analog signals into digital signals that may be input to a microcontroller or other digital computing device. Sensor interface board 352 may be driven/monitored from the input/output expansion ports of the programmable circuit board 103 if power regulation system 301 may include a programmable circuit board 103. Sensor interface board 352 may be driven/monitored from an external controller, such as, without limitation, a personal computer, if programmable circuit board 203 is used when power regulation system 301 may include a programmable circuit board 203.

As shown in FIG. 3A, control signals from at least one sensor 350 are connected to a sensor interface circuit board 352. At least one sensor 350 may include, for example, without limitation, a temperature sensor, a pH electrode, or a ORP (REDOX) electrode. At least one sensor 350 is/are placed at the output of post-filter 336. Sensor interface board 352 may include signal conditioning circuitry, operational amplifiers, and/or analog-to-digital convertors in order to convert the sensor analog signals into digital signals that may be input to a microcontroller or other digital computing device. Sensor interface board 352 may be driven/monitored from the input/output expansion ports of the programmable circuit board 103 if power regulation system 301 may include a programmable circuit board 103. Sensor interface board 352 may be driven/monitored from an external controller, such as, without limitation, a personal computer, if power regulation system 301 may include a programmable circuit board 203.

As shown in FIG. 3A, valve 354 varies the amount of liquid, for example, without limitation, waste water, to be fed back to the input of the pump 328. This valve allows the output pressure of the pump to be manually/mechanically adjusted, thus allowing the rate of liquid flowing through the electrolytic cell to be adjusted. As an alternative or supplement to using valve 354 to adjust the output pressure of pump 328, pump 328 may be a DC electric pump and a pulse-width modulated signal may be used to drive the pump 328 at various speeds. The circuitry to pulse-width modulate the DC voltage to pump 328 may be, for example, without limitation, included in DC driver board 348 which may be controlled by circuit board 103 in power regulation system 301.

Electric current to electrolytic cell 312 may be provided by power regulation system 301. Power regulation system 301 may include a programmable circuit board 103 or 203, shown in FIGS. 1 and 2, or an equivalent circuit board.

In one embodiment of the present invention, the electrolytic cell may include, without limitation, an axial flow electrolytic cell. In some embodiments, the axial flow electrolytic cell may include a group of electrolytic cells in series and/or parallel. Referring to FIG. 3B, in one embodiment of the present invention, the electrolytic cell 312 may include, without limitation, at least two electrodes 331. The electrolytic cell may further include a chamber 333 where, without limitation, at least two electrodes may be submersed in an electrolyte solution. The electrolyte solution may include, without limitation, water, a water salt solution, a mineral solution, and any substance that contains free ions that make the substance electrically conductive. When electrolytic cell 312 is used in water purification system 300, the electrolyte solution is the waste water. The inlet portion 332 and the outlet portion 334 may provide a gateway for the electrolyte solution to flow in and out of the chamber. Those skilled in the art, in light of the present teaching, will recognize that the flow of the electrolyte solution (as would be needed for water processing and/or purification), and connections (or terminals) that allow an external power source to be connected to the electrode plates in order to charge the electrode plates, may be configured in a variety of alternate ways.

Figure 4:
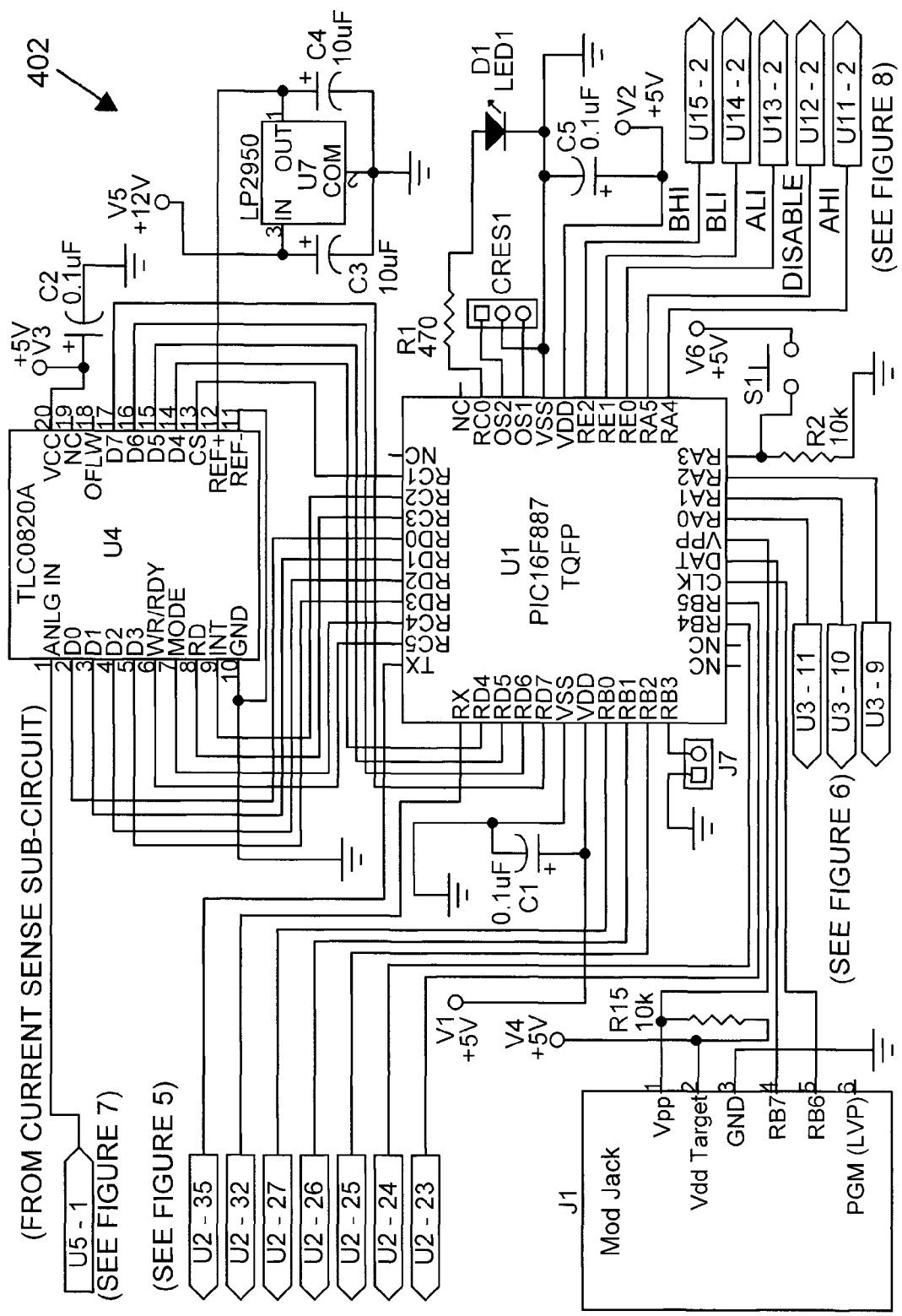
FIG. 4 illustrates a schematic diagram for an exemplary power regulation system, in accordance with an embodiment of the present invention.

FIG. 4 illustrates a schematic diagram 402 for an exemplary power regulation system, in accordance with an embodiment of the present invention. In the present embodiment, the power regulation system may utilize the flash ADC device joined with the processor to perform the analog-to-digital conversion. In one embodiment, after the current sense voltage is conditioned, a flash analog-to-digital convertor, such as the flash ADC device, may be used to convert the current sense analog voltage into an 8-bit binary digital value that is representative of the instantaneous value of the electric current flowing between the H-bridge circuit and a power supply negative ground. The full 8-bit value may be read by one of the 8-bit ports of the processor. Those skilled in the art, in light of the present teaching, will recognize that because the processors, including a PIC16F887, may access 8-bit ports as easily and as efficiently as accessing 8-bit variables, real time programming may require minimal coding. In this manner, the software instructions may be efficiently written using a high level language, including, without limitation, PICBASIC. In some embodiments, the software may function to initiate a flash ADC conversion by writing a zero (low) to bit 3 of Port C of the processor, which may cause the RD pin of the flash ADC device to go low. In one embodiment, within a microsecond, the conversion may be completed and the software may read the 8-bit value from the processor's 8-bit input-output port, including a PORT D.

In one embodiment of the present invention, the processor may capture and analyze the binary value from the flash ADC device. Although the flash ADC device may perform the analog-to-digital conversion in less than a microsecond, the processor may take, for example, without limitation, 15 microseconds or less to analyze the ADC result. The output control may signal to the H-bridge circuit, while under software control in real time. Those skilled in the art, in light of the present teaching, will recognize that based on the value of the 8-bit binary value read from the flash ADC device through the processor PORT D, the software may be programmed to send control signals through output ports connected through optocouplers to the H-bridge circuit to control the direction of the electric current and the average output voltage, thus the average electric current of the output of the H-bridge circuit may be controlled. In some embodiments, the processor may receive long-term timing, including, ninety seconds. The long-term timing may transmit from the timing processor for facilitating software development for the processor. In some embodiments, the processor may also interact with the input-output processor through input-output ports, which serve to offload input-output tasks from the processor and decrease the complexity of the software. The software on the processor may be modified without affecting the software on the input-output processor and the timing processor.

In one embodiment of the present invention, the processor may operatively join with various components, including, without limitation the flash ADC device, a programming jack, a general purpose jack, a general purpose switch, at least one decoupling capacitor, a ceramic resonator, the power supply, a general purpose LED, the timing processor, and the input-output processor.

Figure 5A:
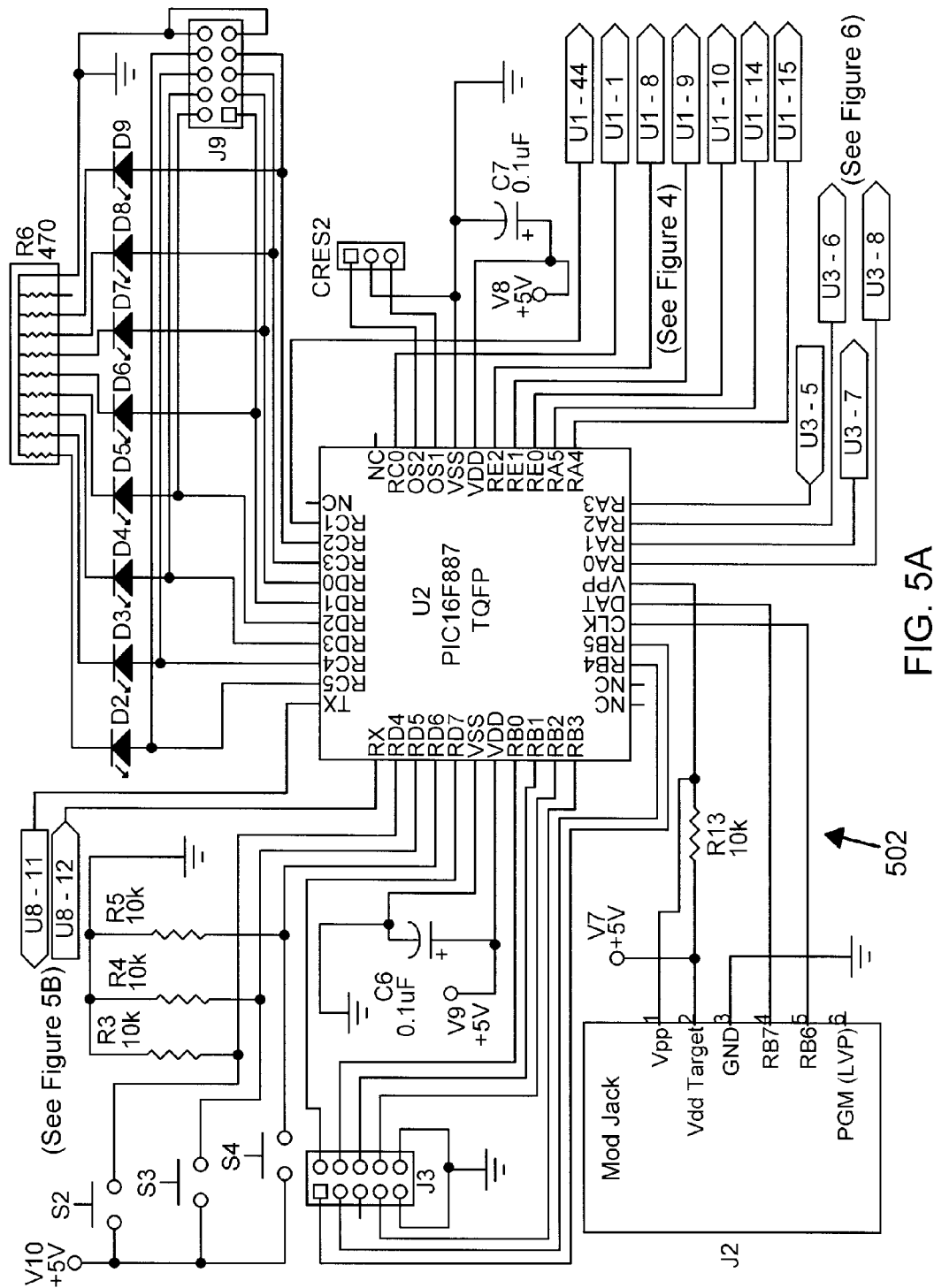
FIGS. 5A and 5B illustrate schematic diagrams for an exemplary power regulation system, where
Figure 5B:
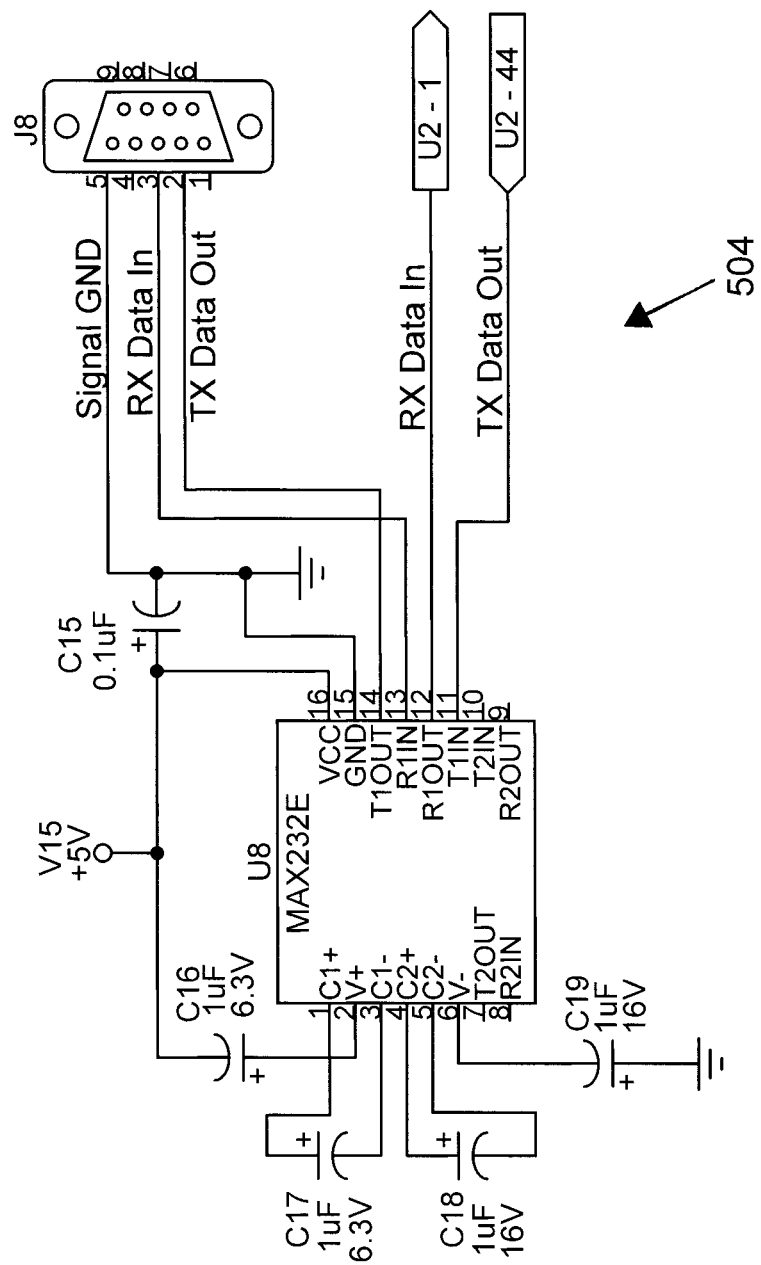

FIGS. 5A and 5B illustrate schematic diagrams for an exemplary power regulation system, where FIG. 5A illustrates a schematic diagram 502 for an exemplary input-output processor and joined components, and FIG. 5B illustrates a schematic diagram 504 for an exemplary RS-232 transceiver interfacing with a communications connector, in accordance with an embodiment of the present invention. In the present embodiment, the power regulation system may include a secondary processor to manage input and output communication with users and with external devices. The input-output processor may include a plurality of internal hardware interfaces that may be controlled by embedded software. The integrated USART or UART interface within the input-output processor may be joined with the RS-232 transceiver interfacing with a communications jack that may be joined to an external device for asynchronous communications that may be performed as a background task by the embedded software written for the input-output processor. In some embodiments, the input-output processor may include connections to three general purpose switches on the circuit board. In one embodiment, the input-output processor may include connections to an array of eight LEDS mounted on the circuit board. The input-output processor may join to a general purpose expansion jack that has eight pins connected directly to the microcontroller input-output ports of U2. The input-output processor may join to a general purpose expansion jack that has seven pins connected directly to the microcontroller input-output ports of U2. Microcontroller U2 may be interfaced with microcontroller U1 in order for these two microcontrollers to interact with each other. Microcontroller U2 may be interfaced with microcontroller U3 in order for these two microcontrollers to interact with each other. The input-output processor may be in-circuit programmed through the programming jack.

In one embodiment of the present invention, the timing processor may include a programmable timer that is accessible from additional processors. The timing processor may be in-circuit programmable and may join with the processor and the input-output processor. Those skilled in the art, in light of the present teaching, will recognize that by utilizing the timing processor for generating timing intervals for longer time period operations, including 90 seconds, for the processor and the input-output processor, the software in the processor and the input-output processor may be simplified. For example, without limitation, when PIC microcontrollers execute programs developed using the PICBasic© compiler, the PICBasic© PAUSE( ) functions affect the accuracy of the internal microcontroller timers that are interrupt driven. Although software modifications may be written to adjust for timing errors, the software modifications can be tedious and time consuming to perform. Each software change may require the timing corrections to be adjusted and tested. However, the timing processor may eliminate the necessity of constant changes in the software, thereby reducing errors.

Figure 6:
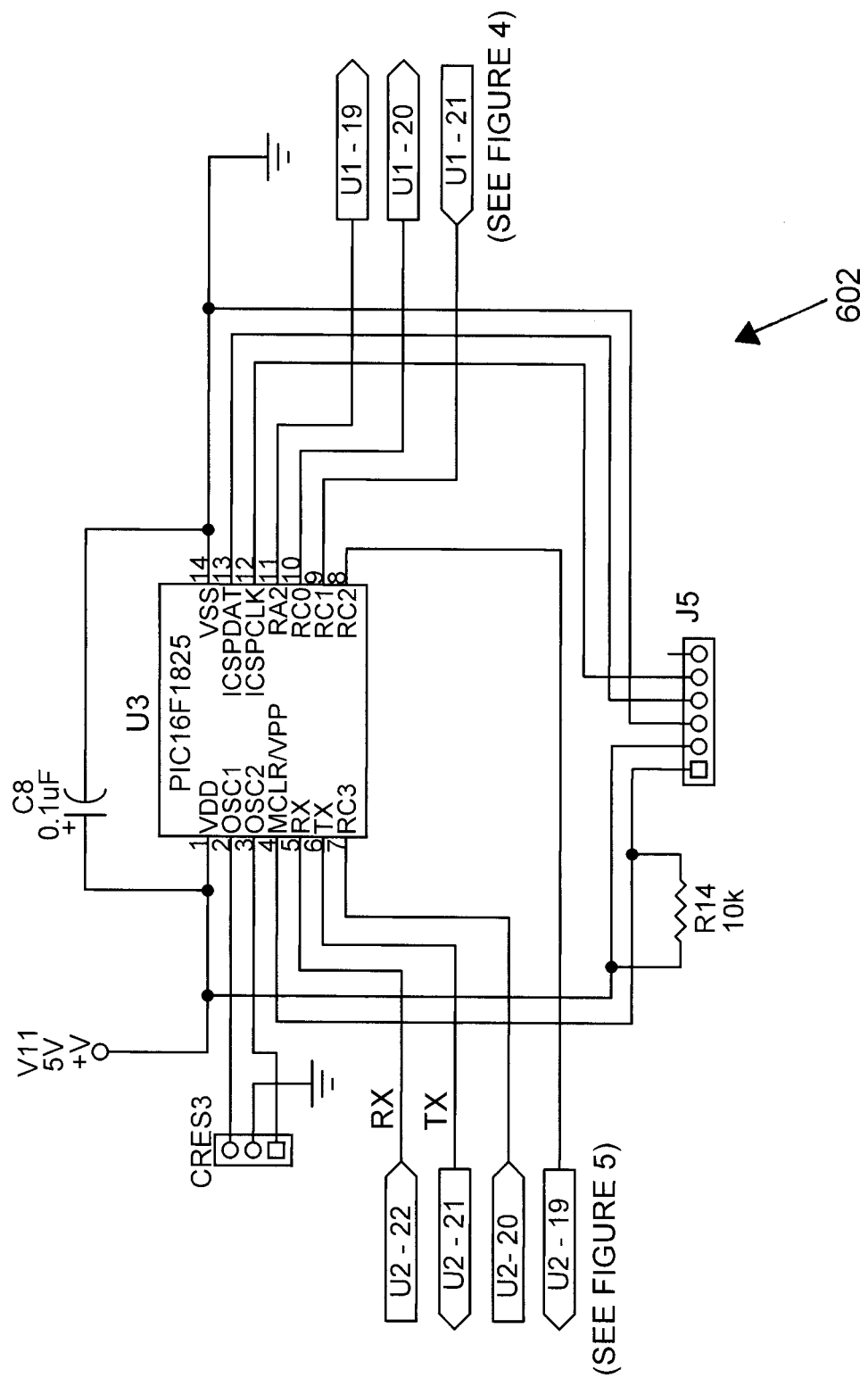
FIG. 6 illustrates a schematic diagram for an exemplary timing processor in an exemplary power regulation system, in accordance with an embodiment of the present invention.

FIG. 6 illustrates a schematic diagram 602 for an exemplary timing processor in an exemplary power regulation system, in accordance with an embodiment of the present invention. In the present embodiment, the timing processor may join with a plurality of programming connectors, a decoupling capacitor, a ceramic resonator, a D/C power supply, the processor, and the input-output processor. In some embodiments, the grounds may join with the power regulation system's negative power input.

Figure 7:
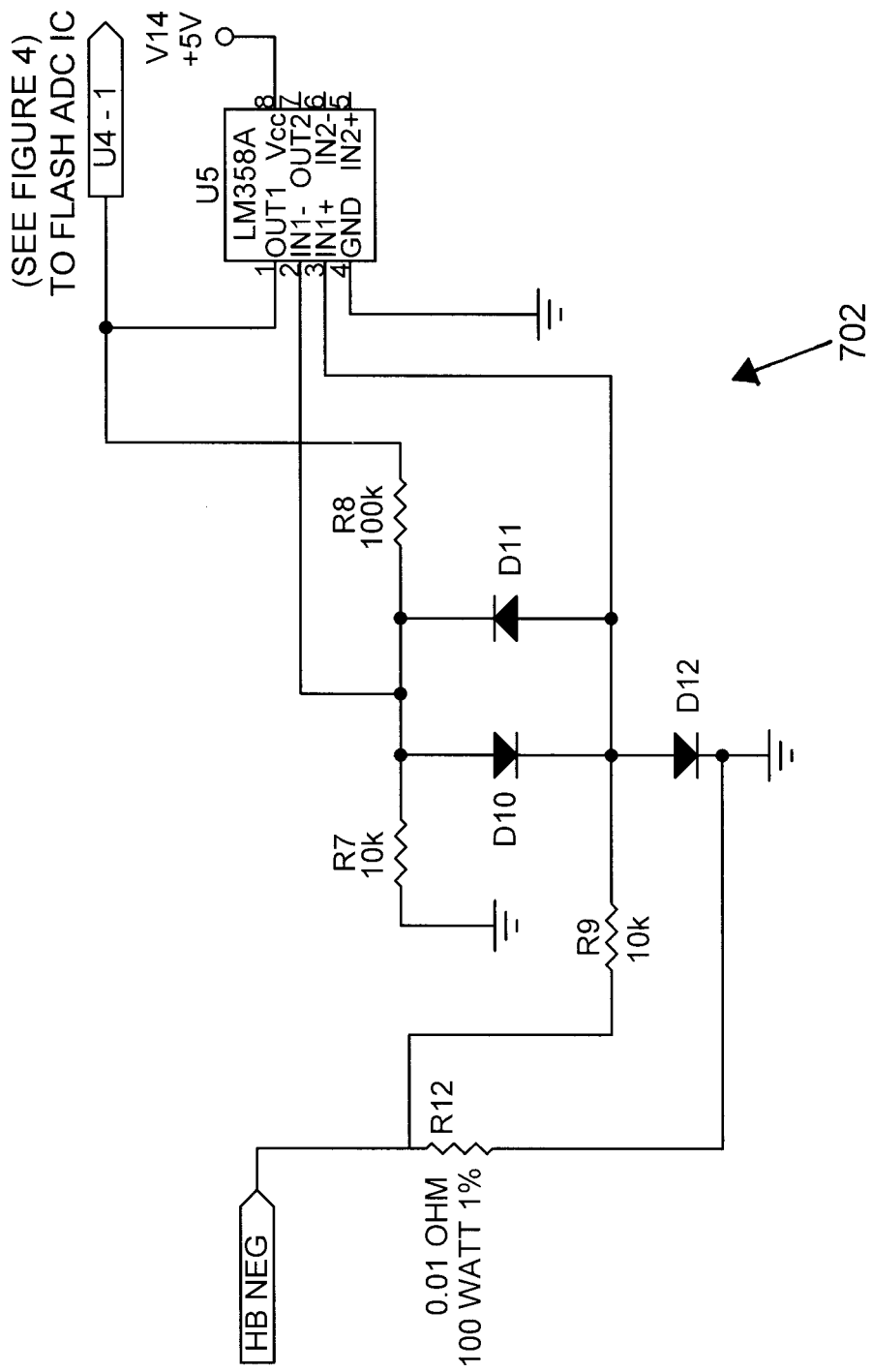
FIG. 7 illustrates a schematic diagram for an exemplary power regulation system, in accordance with an embodiment of the present invention.

FIG. 7 illustrates a schematic diagram 702 for an exemplary power regulation system, in accordance with an embodiment of the present invention. In the present embodiment, the current sense circuit may utilize a forward-biased diode in the current sense conditioning circuit to limit, or clamp, the current sense signal input. In some embodiments, the current sense signal conditioning circuit may include a forward-biased small signal schottky diode, including, without limitation, 350 milliamps. The schottky diode may be utilized rather than a zener diode to limit or clamp the incoming signal. Those skilled in the art, in light of the present teaching, will recognize that this is because the current sense signal voltage input may be less than 0.4 volts and the forward-biased small signal schottky diode may gradually increase its conduction as the voltage across the diode increases from 0.2 to 0.8 volts. In some embodiments, a zener diode may not be available for clamping voltages less than 1.8 volts. In this manner, the forward-biased small signal schottky diode may provide better protection for the operational amplifier than a zener diode. In some embodiments, the power regulation system may limit at higher current sense voltages. Two or three forward-biased small signal schottky diodes may be placed in series which may serve to double or triple the minimum voltage level to be clamped. In other words, this may allow the current sense circuit to sense greater current sense voltages such as, for example, 0.9 volts which may represent a current of 90 amps flowing through the current sense resistor. The current sense circuit in FIG. 14 performs the same primary function as the current sense circuit in FIG. 7; however, the circuit in FIG. 14 does not include the protection diodes that are contained in the circuit in FIG. 7. The current sense circuit in FIG. 7 may be used with the exemplary power regulation system shown in FIG. 1 as well as with the exemplary streamlined version of the power regulation system shown in FIG. 2. The current sense circuit in FIG. 14 may be used with the exemplary power regulation system shown in FIG. 1 as well as with the exemplary streamlined version of the power regulation system shown in FIG. 2.

In one embodiment of the present invention, the current sense resistor may include, without limitation, a 0.01 Ohm 100 Watt 1% current sense resistor. The resistor may be mounted on a large heatsink and heatsink compound. The heatsink compound may enhance heat transfer from the resistor to the heatsink. Those skilled in the art, in light of the present teaching, will recognize that as current flows through the current sense resistor on its way to the H-bridge circuit, a voltage may generate at the top of the current sense resistor. For example, without limitation, when 20 Amps is flowing through the current sense resistor to the H-bridge circuit, a positive 0.2 volts may develop at the top of the current sense resistor. The voltage may then pass over a limiting resistor. The purpose of the limiting resistor may include limiting the current flow through the voltage limiting (shunt) forward biased Schottky diode. Diodes may be used to protect the positive input of operational amplifier. Additional resistors may provide a voltage divider and the ratio of these two resistors closely determines the amplification factor of the operational amplifier. Thus, the amplification factor of the op amp may be roughly times 10. In some embodiments, tolerance variations of the components and circuit board may be compensated for in the reference/calibration data values that are programmed within the embedded software in the processor. Schottky diodes may function as differential input limiting diodes protecting the negative input of operational amplifier. The limited and amplified current sense voltage signal from this subcircuit is then fed from the output of the op amp (pin 1) to the analog input of the flash ADC device. The flash ADC device may be powered from the 5 volt supply at the pin, and may be decoupled with a capacitor. In one embodiment, the flash ADC device may receive +REF input from the voltage regulator. The GND (−) and the −REF of the flash ADC device may join together to set the −REF input equal to the circuit ground (−). The flash ADC device may be controlled by the processor. In some embodiments, there may be two modes of operation of the flash ADC device used with the power regulation system, the Read mode and the Write mode. In some embodiments, the READ mode may work well in the power regulation system. In another embodiment, the MODE and WR/RDY connections of the flash ADC device may be left disconnected when using the READ mode of the flash ADC device.

In one embodiment of the present invention, the flash ADC device may be enabled by setting the processor as follows: port C bit 1 to a LOW (logic 0) state which may causes a chip select pin of the flash ADC device to be pulled LOW. In yet another embodiment, to initiate an ADC conversion using the READ mode of the flash ADC device, the processor may pull the ADC RD pin low by setting PORT C bit 3 to a LOW (logic 0) state. In less than a microsecond, the ADC result may be available for the processor to read through PORT D. In some embodiments, after the flash ADC device result is read into the processor port D, the processor may return the RD pin to a HIGH state by setting PORT C pin 3 to a HIGH state. Based on the 8-bit value read from the flash ADC device, the embedded software may modify the duty cycle and/or frequency of the pulses that will be sent out of the processor to the optocouplers that will transmit the control signals to the external H-bridge circuit.

Figure 8:
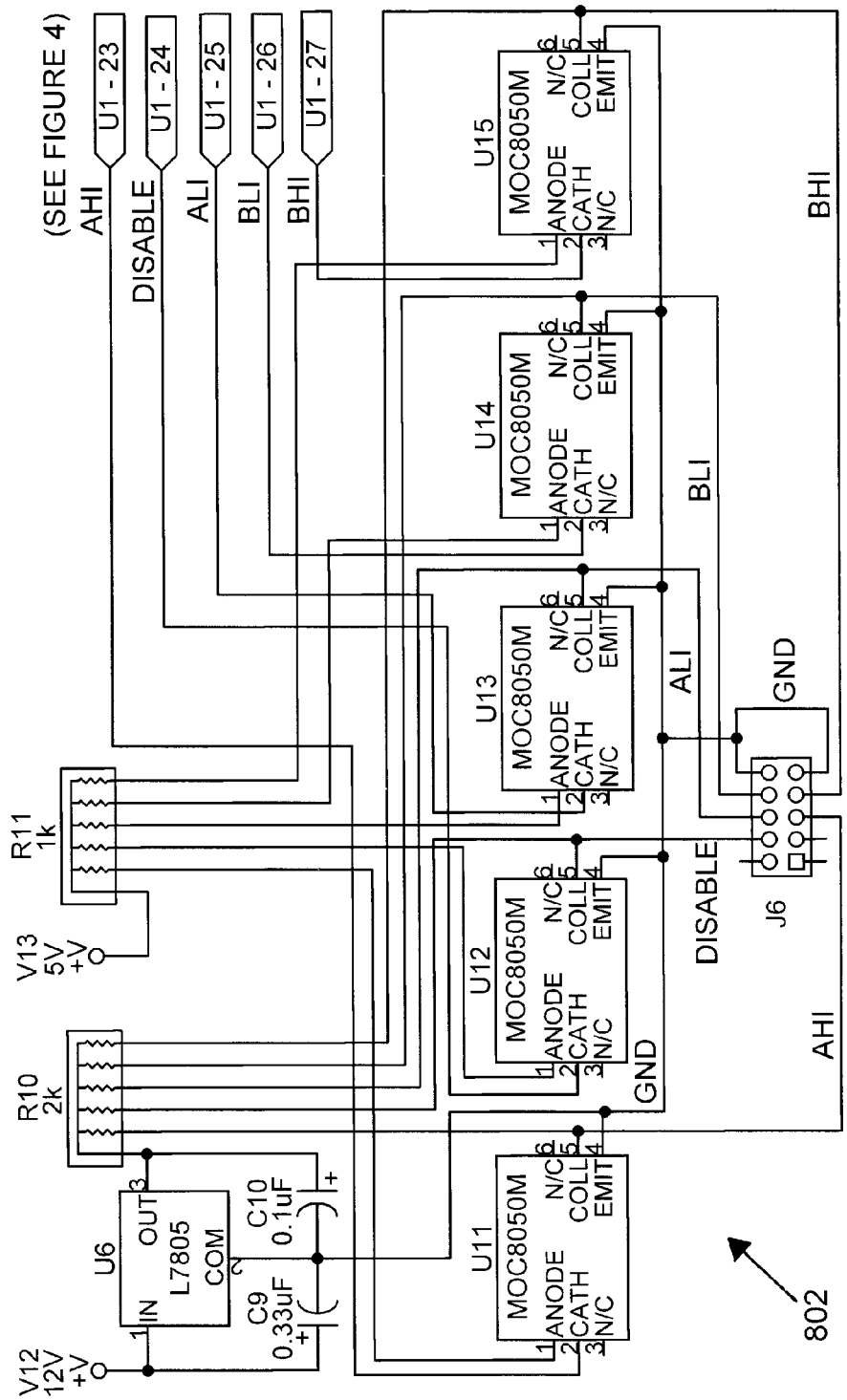
FIG. 8 illustrates a schematic diagram for connections from an exemplary processor to exemplary optocouplers, in accordance with an embodiment of the present invention.

FIG. 8 illustrates a schematic diagram 802 for connections from an exemplary processor to exemplary optocouplers, in accordance with an embodiment of the present invention. In the present embodiment, the power regulation system may utilize optocouplers to isolate the negative voltage ground and control signals of the processor from the negative voltage ground and control signal receivers of the H-bridge circuit. Those skilled in the art, in light of the present teaching, will recognize that because the negative voltage ground level of the H-bridge circuit may be constantly changing due to the varying voltage drop across the current sense resistor R12 in the H-bridge's negative voltage ground path to the D/C power supply, the negative ground voltage of the H-bridge circuit may be a different voltage from the negative ground voltage of the processor. For this reason, the control signals from the processor to the H bridge may need to be optically coupled. In some embodiments, the negative voltage ground signal of the H-bridge circuit may be used as a negative voltage ground reference for the voltage regulator that supplies DC power to the respective Darlington transistor outputs of the optocouplers. In this manner, the output signal levels of the optocouplers may reliably reach the correct logic levels for the H-bridge circuit when control data is being sent from the processor to the H-bridge circuit, regardless of the difference between the negative voltage ground potentials of the two devices. In yet another embodiment, the optocouplers may be used to convert 5 volt TTL logic level outputs of the processor to a different logic voltage level that may be used by a different H-bridge circuit. Those skilled in the art, in light of the present teaching, will recognize that this may be achieved by using a voltage regulator with a different output voltage and a different pull-up resistor array with a different resistance value.

Figure 9:
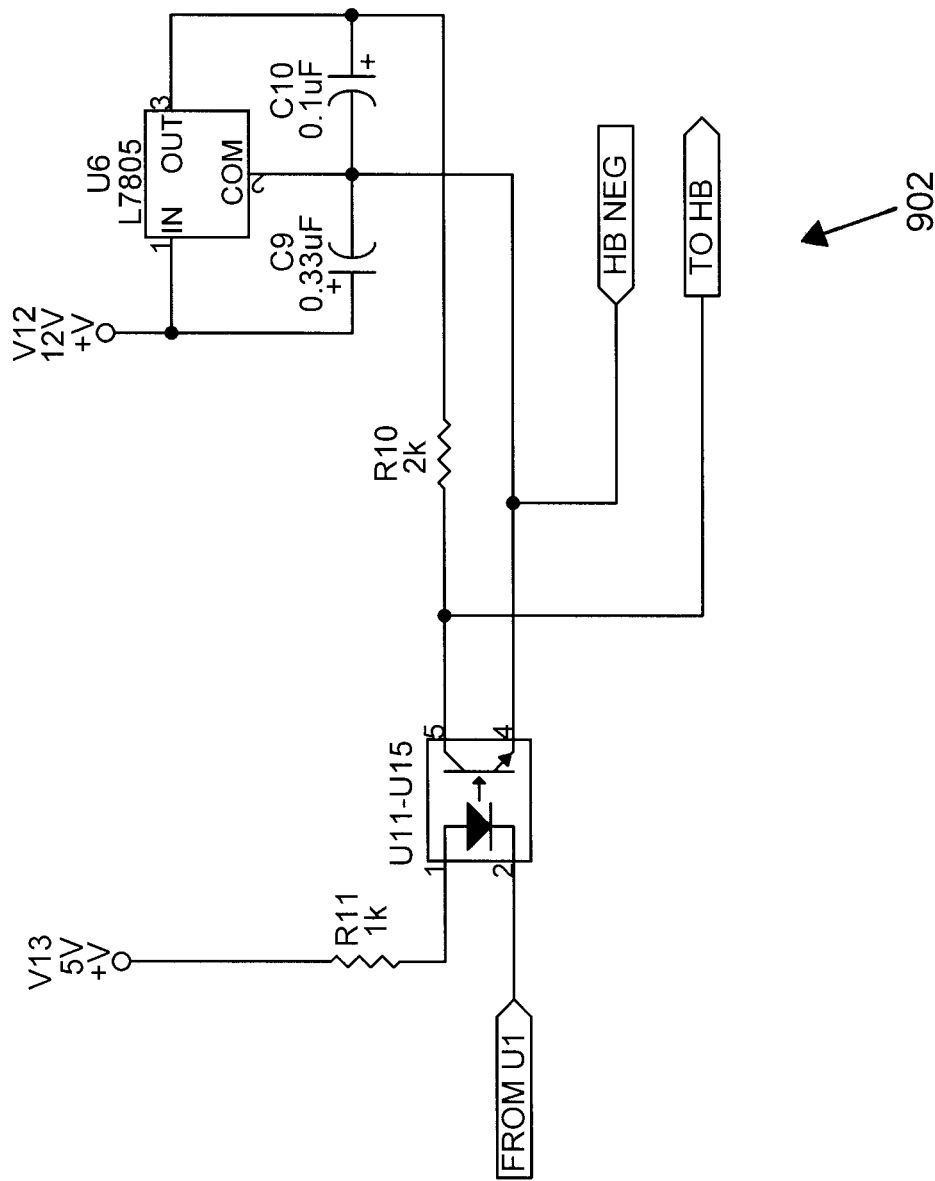
FIG. 9 illustrates a schematic diagram for exemplary optoisolators in an exemplary power regulation system, in accordance with an embodiment of the present invention.

FIG. 9 illustrates a schematic diagram 902 for exemplary optoisolators in an exemplary power regulation system, in accordance with an embodiment of the present invention. In the present embodiment, each optoisolator may be wired (biased) so the input signal and the output signal are in phase with each other. In one embodiment, each of the 5 optoisolators may receive an input control line from the processor joined to the cathode of its internal LED. The anode of each optoisolator LED may be pulled HIGH through resistor array R11. Those skilled in the art, in light of the present teaching, will recognize that on the output Darlington transistor of each optocoupler, the emitter may be driven negative by the negative ground line that is fed from the external H-bridge circuit. The collector output may include the control signal sent to the H-bridge circuit and is pulled high through resistor array R10 by the voltage regulator U6. The voltage regulator U6 may be referenced to the negative voltage ground of the external H-bridge circuit so the output signal logic levels may shift to be the correct level, regardless of the fact that the negative voltage ground of the H-bridge circuit may vary according to the voltage drop across the current sense resistor R12.

Figure 10:
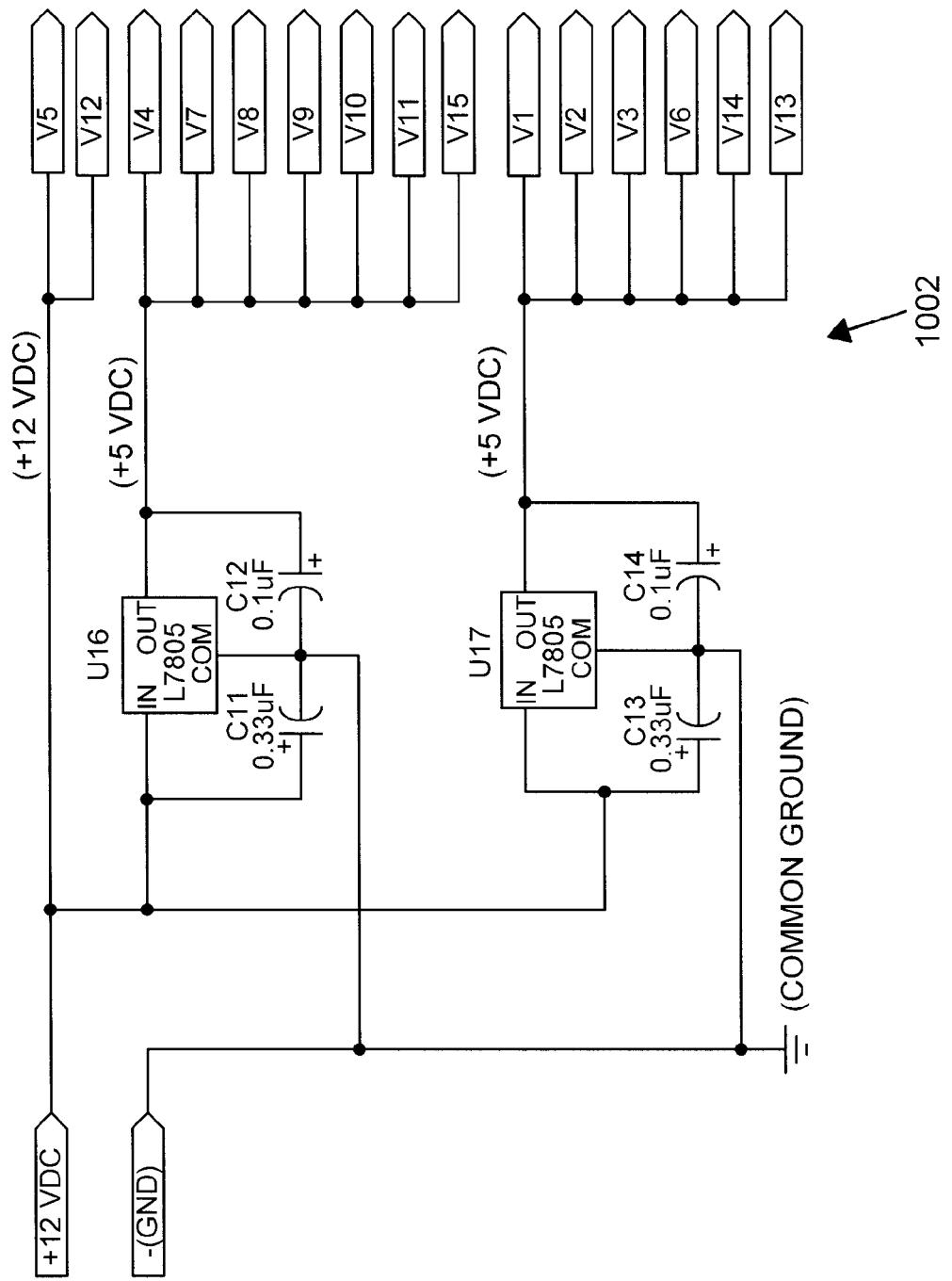
FIG. 10 illustrates a schematic diagram for power distribution in an exemplary power regulation system, in accordance with an embodiment of the present invention.

FIG. 10 illustrates a schematic diagram 1002 for power distribution in an exemplary power regulation system, in accordance with an embodiment of the present invention. In the present embodiment, the power distribution may include two positive 5 volt regulators in the power regulation system. The two voltage regulators U16 and U17 may convert the +12 volt supply voltage to the positive +5 volt power that may be used by components of the power regulation system. The input supply voltage to regulators U16 and U17 may not be limited to +12 volts DC; specifications of +5 volt voltage regulators may allow for wide ranges of input voltages, thus the input voltage supply to the regulators U16 or U17 or circuit 103 or circuit 203 may be, for example, without limitation, +15 volts DC. In some embodiments, the 5 volt demands of the entire power regulation system may be distributed between voltage regulators U16 and U17. The power distribution circuit shown in FIG. 10 may be used with the power regulation system shown in FIG. 1, whereas the power distribution circuit shown in FIG. 15 may be used with the streamlined power regulation system shown in FIG. 2. Although one regulator may supply enough electric current to drive circuit 103 or 203, the advantage of using two regulators instead of using one regulator may be that the heat that may be generated as a result of regulating the DC voltage may be distributed across multiple regulators, thus eliminating the need for a heat sink, for example.

FIG. 11 illustrates an exemplary component list for an exemplary power regulation system, in accordance with an embodiment of the present invention. In the present embodiment, the component list 1100 may include, without limitation, resistors, capacitors, voltage regulators of various sizes and dimensions. In one embodiment, the components may include a directional circuit used to process current sense feedback in real time for controlling the direction and rate of electric current flowing into the H-bridge circuit. Those skilled in the art, in light of the present teachings will recognize that an H-bridge may include an electronic circuit that enables a voltage to be applied across a load in a plurality of directions. The H-bridge circuit may be utilized with robotics and other applications to allow DC motors to run forwards and backwards. The H-bridge circuit may include, without limitation, integrated circuits, or may be built from discrete components.

Figure 12:
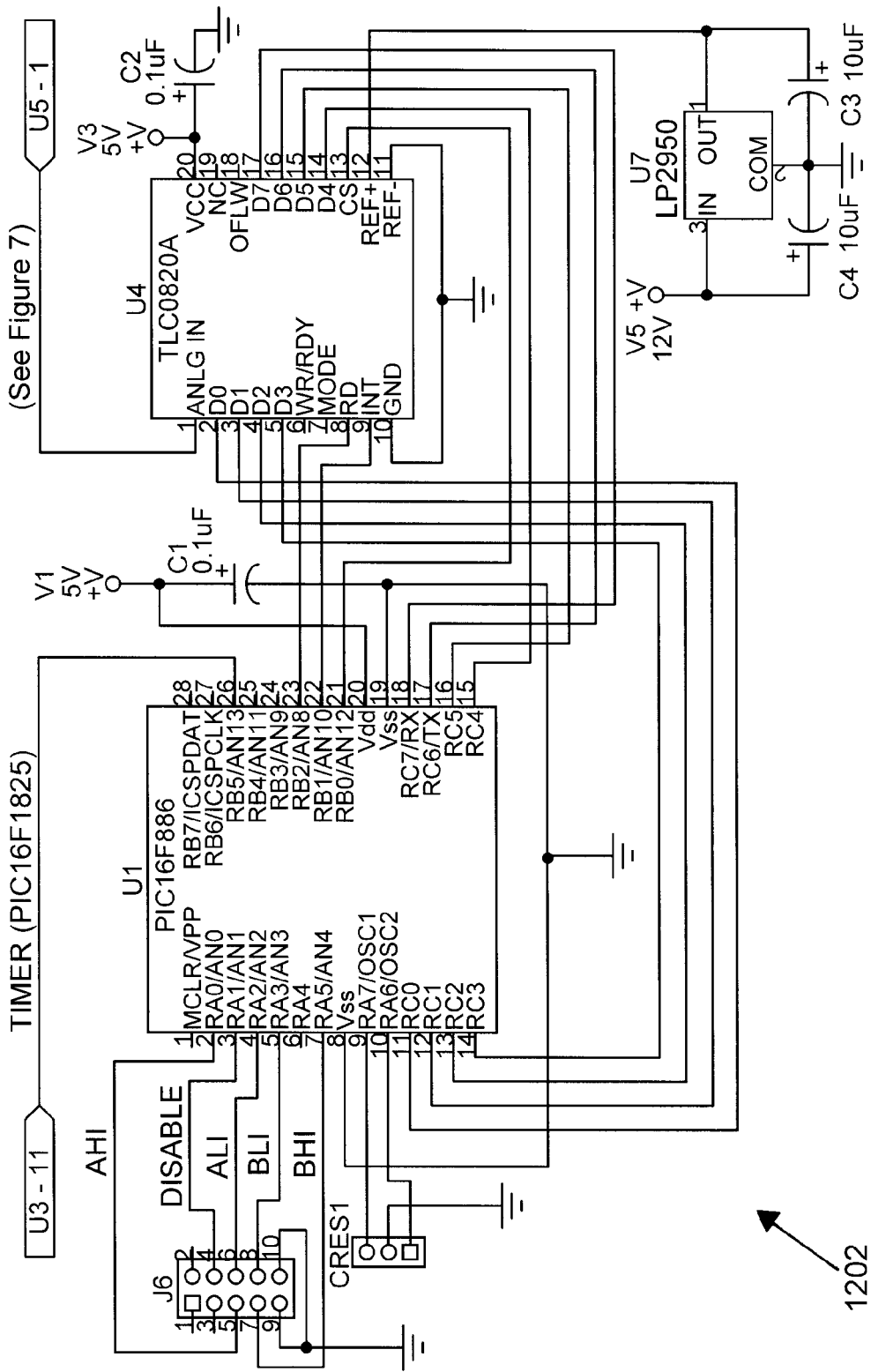
FIG. 12 illustrates a schematic diagram for an exemplary processor and an exemplary flash ADC device, in accordance with an embodiment of the present invention.

FIG. 12 illustrates a schematic diagram 1202 for an exemplary processor and an exemplary flash ADC device, in accordance with an embodiment of the present invention. In the present embodiment, the flash ADC device may be enabled by setting the processor as follows: PORT B bit 0 to a LOW (logic 0) state which may cause a chip select pin of the flash ADC device to be pulled LOW. In yet another embodiment, to initiate an ADC conversion using the READ mode of the flash ADC device, the processor may pull the ADC RD pin low by setting PORT B bit 2 to a LOW (logic 0) state. In less than a microsecond the ADC result may be available for the processor to read through PORT C. In some embodiments, after the flash ADC device result is read into the processor PORT C, the processor may return the RD pin to a HIGH state by setting PORT B bit 2 to a HIGH state. Based on the 8-bit value read from the flash ADC device, the embedded software may modify the duty cycle and/or frequency of the pulses that will be sent out of the processor to the optocouplers that will transmit the control signals to the external H-bridge circuit. The minimum and maximum duty cycles may range from zero percent to 100 percent, respectively. The minimum frequency of the pulse width modulated signal sent from the processor to the H bridge may be zero hertz. The maximum average frequency of the pulse width modulated signal sent from the processor to the H bridge may be limited by the specifications of the H bridge, which may specify a maximum frequency of 15 kilohertz.

The signal waveform of the pulse width modulated signal from the processor to the H bridge is nonperiodic, meaning that the waveform does not repeat itself at fixed intervals and is composed of pulses of differing pulse widths and/or differing time intervals between the pulses; thus, there may be no fixed frequency. The exemplary software pseudocode shown in FIG. 16 and the flowcharts shown in FIGS. 17 and 18 illustrate examples of one possible method of regulating the power by inserting predefined delays within the pulse width modulated (PWM) signal, based on the values of the current sense feedback voltage that is read from the flash ADC by the processor. During each delay, the PWM signal that is sent from the processor to the H bridge is driven to a continuous off or zero state which turns off the output from the H bridge. The greater the values of the current sense voltage, the greater the off time intervals. The reference values or calibration data that the processor may use to make comparisons with the ADC results in order to determine the necessary off time intervals may be stored, for example, without limitation, in EEPROM or flash memory. If the value of the current sense voltage falls below a predetermined value, there may be no off time periods, and the PWM signal waveform from the processor to the H bridge may remain at a high, logic 1 state; in that case, the H bridge may deliver a constant DC voltage to the load that may be approximately equal to the voltage output of the DC power supply that supplies power to the H bridge. If the value of the current sense voltage rises above predetermined values, there may be progressively longer off time intervals, and the PWM signal waveform from the processor to the H bridge may be pulsed DC; in that case, the H bridge may deliver a reduced average DC voltage to the load in order to limit the average current flowing through the load as well as through the DC power supply.

The calibration data values may be determined through experimentation. The exemplary software pseudocode shown in FIG. 16 and the exemplary flowcharts shown in FIGS. 17 and 18 illustrate a subroutine named SET_CAL_DEFAULTS that assigns exemplary values to variables used to relate electric current amperage values with ADC result values in order to develop the PWM signals that will be sent to the H bridge in order to regulate the average current to no more than 20 AMPS. In order to regulate at different average current amperage levels, different calibration values may be required.

In one embodiment of the present invention, the flash ADC device may be utilized to convert the conditioned analog current sense voltage into an 8-bit binary (digital) value that is output at the 8-bit parallel data output port of the flash ADC device. Those skilled in the art, in light of the present teaching, will recognize that the embedded software in the processor may initiate a flash ADC conversion by writing a zero (low) to bit 2 of Port B of the processor. This action may cause the RD pin of the flash ADC device to go low. Within a microsecond the ADC conversion may be complete and the embedded software may read the 8-bit value from the processor's 8-bit input-output port PORT C. In yet another embodiment, the current sense resistor may be placed in the negative (ground) path between the H-bridge circuit and the at least one power supply. In some embodiments, having the current sense resistor in the negative (ground) path may allow the current sense circuit to be less complex than if it were in the positive voltage path from the H-bridge's power supply. In yet another embodiment, the voltage generated across the current sense resistor may be representative of the total current supplied by the at least one power supply. Thus, the power regulation system may perform the realtime feedback processing necessary to cause the H-bridge circuit to regulate the electric current based on the limitations of the power supply and not only by the limitations of the resistive-capacitive load that the H-bridge is driving.

In one embodiment of the present invention, the flash ADC device may be powered from the 5 volt supply at pin 20 and may be decoupled with capacitor C2. The flash ADC device may receive its +REF (pin 12) input from the voltage regulator U7. The GND (−) pin 10 and the −REF (pin 11) of ADC U4 may join together to set the −REF input equal to the circuit ground (−). In some embodiments, the flash ADC device may be controlled by the processor. In some embodiments, there may be two modes of operation of the flash ADC device used in the power regulation system. The two modes of operation may include the Read mode and the Write mode. The READ mode may function efficiently in the power regulation system. The MODE and WR/RDY pins of the flash ADC device may be left disconnected when using the READ mode, and these pins may be left disconnected. Those skilled in the art, in light of the present teaching, will recognize that to enable the flash ADC device, the processor may set port B bit 0 to a LOW (logic 0) state which may causes the CS (chip select) pin of the flash ADC device to be pulled LOW. To initiate an ADC conversion using the READ mode of the flash ADC, the processor may pull the ADC RD pin low by setting PORT B bit 2 to a LOW (logic 0) state. In less than a microsecond the ADC result may be available for the processor to read via PORT C. In some embodiments, after the ADC result is read into the processor port C, the processor may return the RD pin to a HIGH state by setting PORT B bit 2 to a HIGH state. Based on the 8-bit value read from the flash ADC device, the embedded software may modify the duty cycle and/or frequency of the pulses sent from the processor to the external H-bridge circuit.

In one embodiment of the present invention, processor input-output ports may be joined to H bridge communications jack J6, without the use of optical isolation circuitry between the processor and the H bridge. Although the power regulation system may function without optical isolation between the processor and the H bridge, it may not work reliably in all environments because the negative voltage ground level of the H-bridge circuit may be constantly changing due to the varying voltage drop across the current sense resistor in the H-bridge's negative voltage ground path to the D/C power supply. For more reliable performance, the circuit illustrated in FIG. 8 may be used. Those skilled in the art, in light of the present teaching, will recognize that because the negative voltage ground level of the H-bridge circuit may be constantly changing due to the varying voltage drop across the current sense resistor in the H-bridge's negative voltage ground path to the D/C power supply, the negative voltage ground signal of the H-bridge circuit may be a different voltage from the negative voltage ground of the processor. For this reason, the control signals from the processor to the H bridge may need to be optically coupled with the circuit illustrated in FIG. 8.

Figure 13:
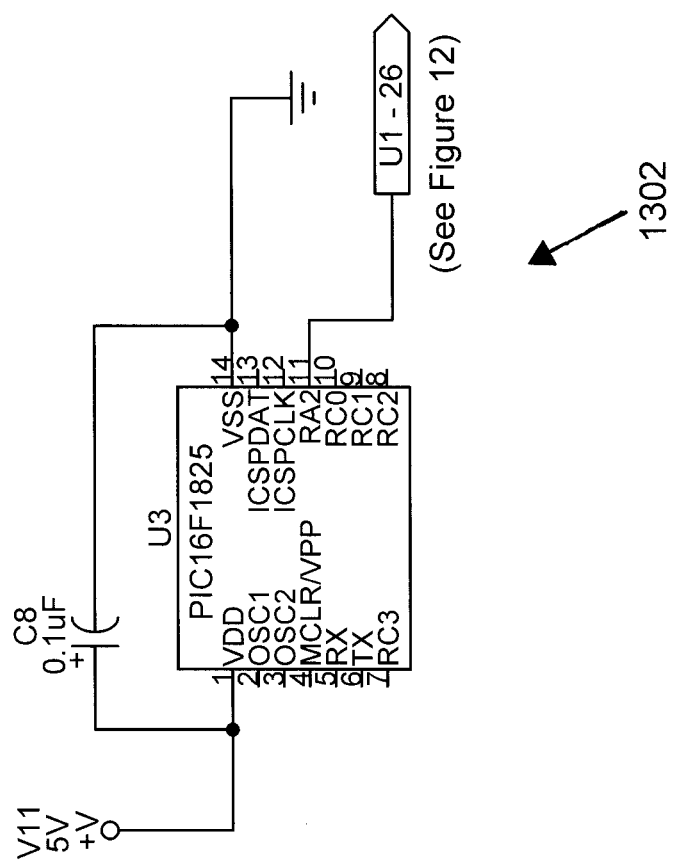
FIG. 13 illustrates a schematic diagram for an exemplary timing processor, in accordance with an embodiment of the present invention.

FIG. 13 illustrates a schematic diagram 1302 for an exemplary timing processor, in accordance with an embodiment of the present invention. In the present embodiment, the processor may receive long-term timing, including, ninety seconds. The long-term timing may transmit from the timing processor for facilitating software development for the processor. In some embodiments, the processor may also interact with the input-output processor through input-output ports, which serve to offload input-output tasks from the processor and decrease the complexity of the software. The software on the processor may be modified without affecting the software on the input-output processor and the timing processor. In some embodiments, the timing processor may be in-circuit programmable and join with the processor and the input-output processor. Those skilled in the art, in light of the present teaching, will recognize that by utilizing the timing processor for generating timing intervals for longer time period operations, including 90 seconds, for the processor and the input-output processor, the software in the processor and the input-output processor may be simplified. For example, without limitation, when PIC microcontrollers execute programs developed using the PICBasic© compiler, the PICBasic© PAUSE( ) functions affect the accuracy of the internal microcontroller timers that are interrupt driven. Although software modifications may be written to adjust for timing errors, the software modifications can be tedious and time consuming to perform. Each software change may require the timing corrections to be adjusted and tested. However, the timing processor may eliminate the necessity of constant changes in the software, thereby reducing errors.

Figure 14:
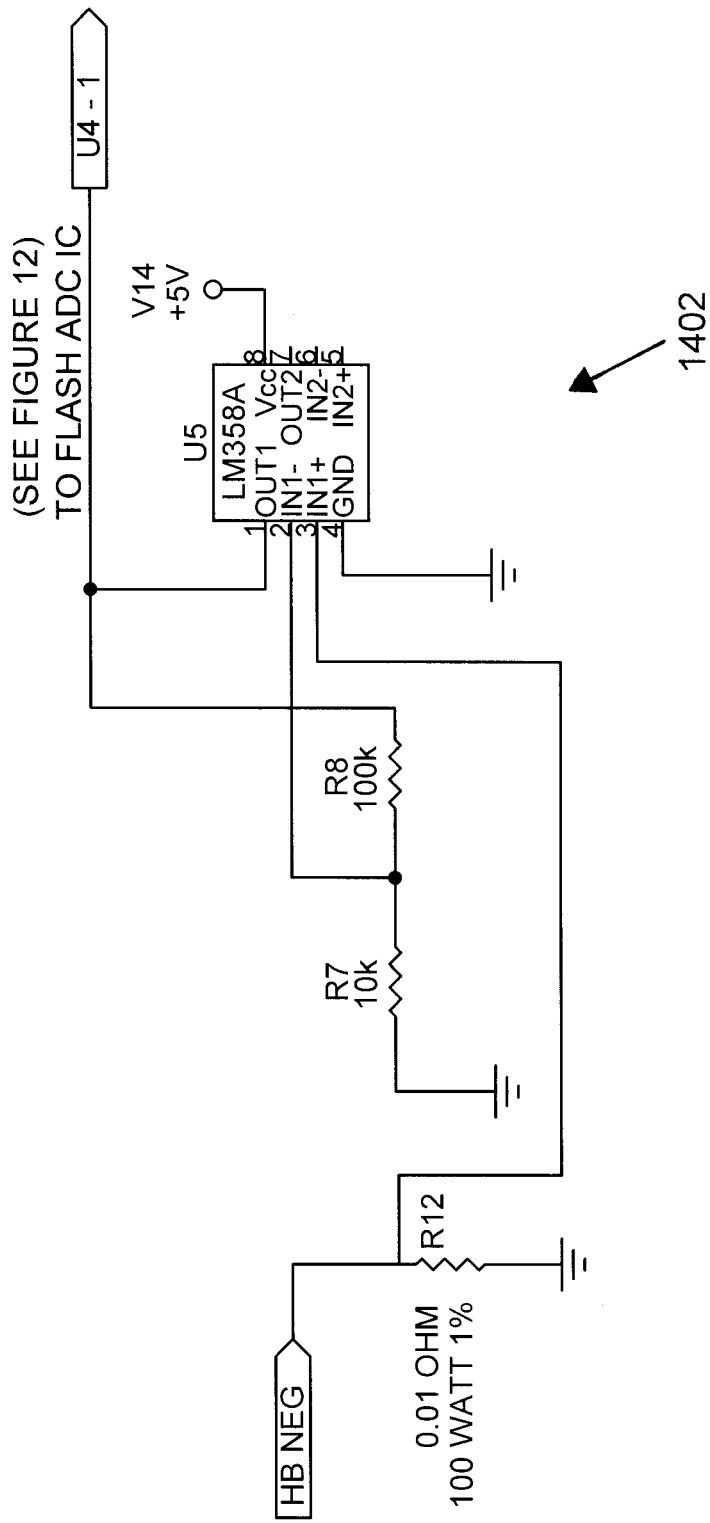
FIG. 14 illustrates a schematic diagram for an exemplary current sense circuit, in accordance with an embodiment of the present invention.

FIG. 14 illustrates a schematic diagram 1402 for an exemplary current sense circuit, in accordance with an embodiment of the present invention. In the present embodiment, the current sense resistor (R12) may include, without limitation, a 0.01 Ohm 100 Watt 1% current sense resistor. The current sense resistor may mount on a large heatsink and heatsink compound may be used to improve heat transfer from the resistor to the heatsink. As current flows through the current sense resistor on its way to the H-bridge circuit, a voltage may developed at the top of the current sense resistor. For example, when 20 Amps is flowing through the current sense resistor to the H-bridge circuit, a positive 0.2 volts may generate at the top of the current sense resistor. The current sense voltage may be fed into the positive input of operational amplifier U5. In some cases, resistors R7 and R8 may include a voltage divider and the ratio of these two resistors may determine the amplification factor of the operational amplifier U5. The amplification factor of the op amp may be roughly times 10. Tolerance variations can be compensated for in the reference, or calibration data values programmed within the embedded software in the processor. In one embodiment, the amplified current sense voltage signal from the subcircuit may then be fed from the output of the op amp U5 (pin 1) to the analog input of flash ADC U4 (pin 1).

Figure 15:
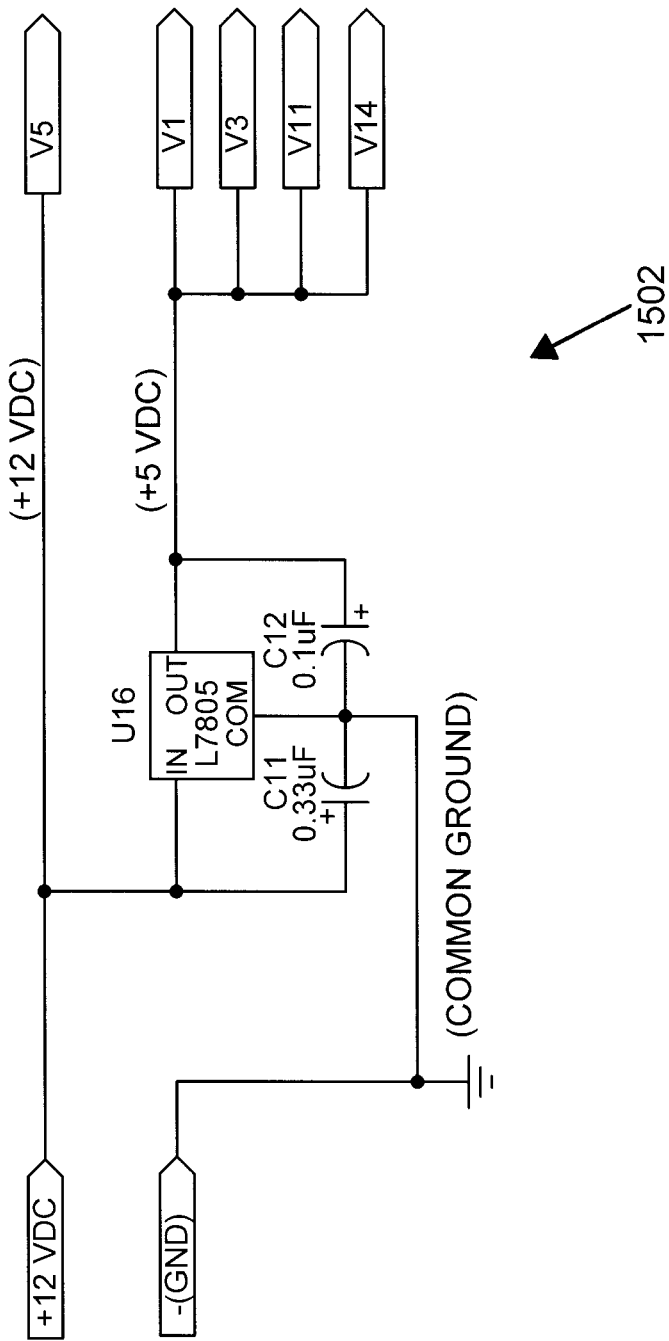
FIG. 15 illustrates a schematic diagram for the power distribution for an exemplary power regulation system, in accordance with an embodiment of the present invention.
Figure 17A:
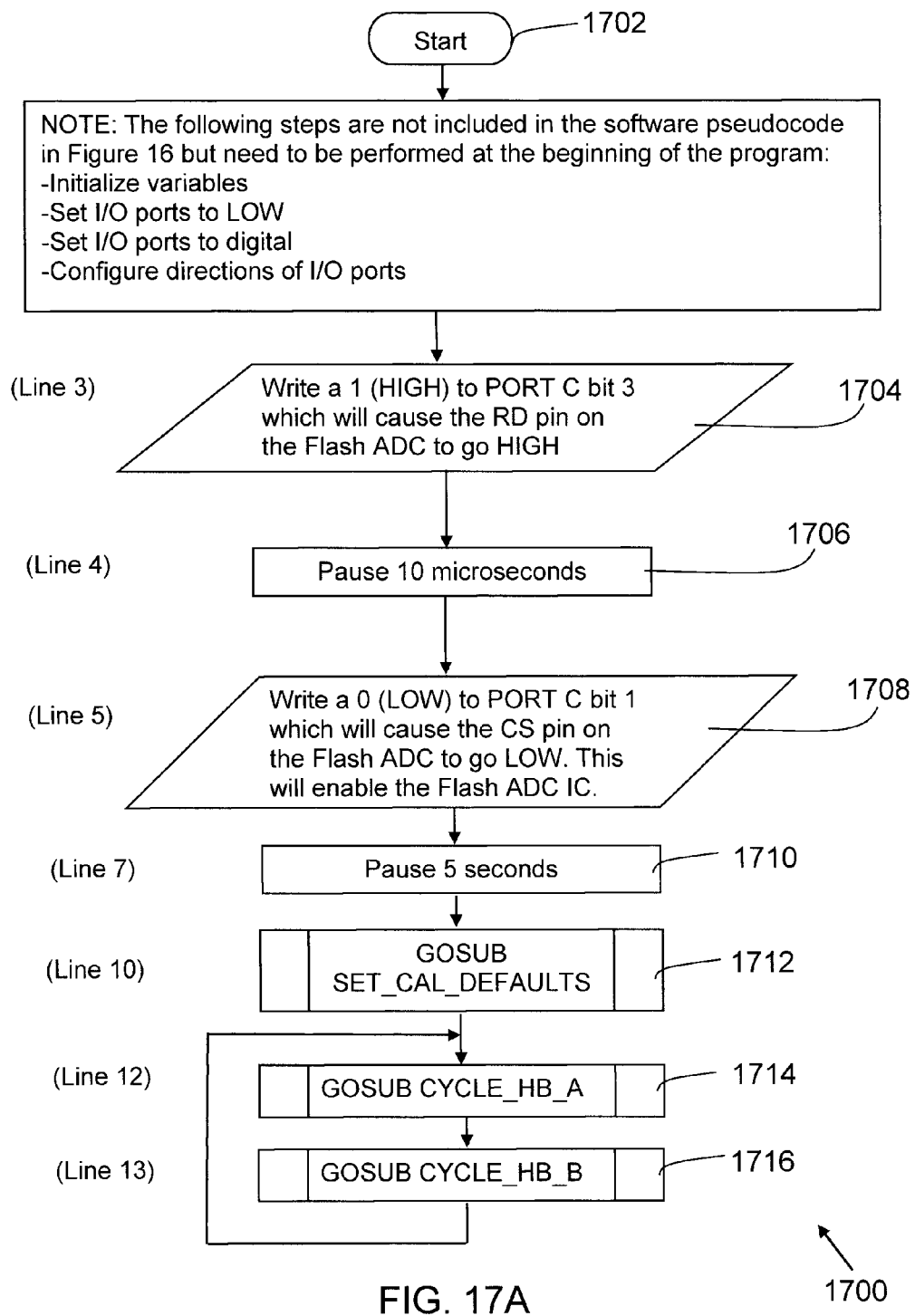
FIGS. 17A-17J illustrate a logic flow flowchart for an exemplary first embodiment of the power regulation system, in accordance with an embodiment of the present invention.
Figure 17B:
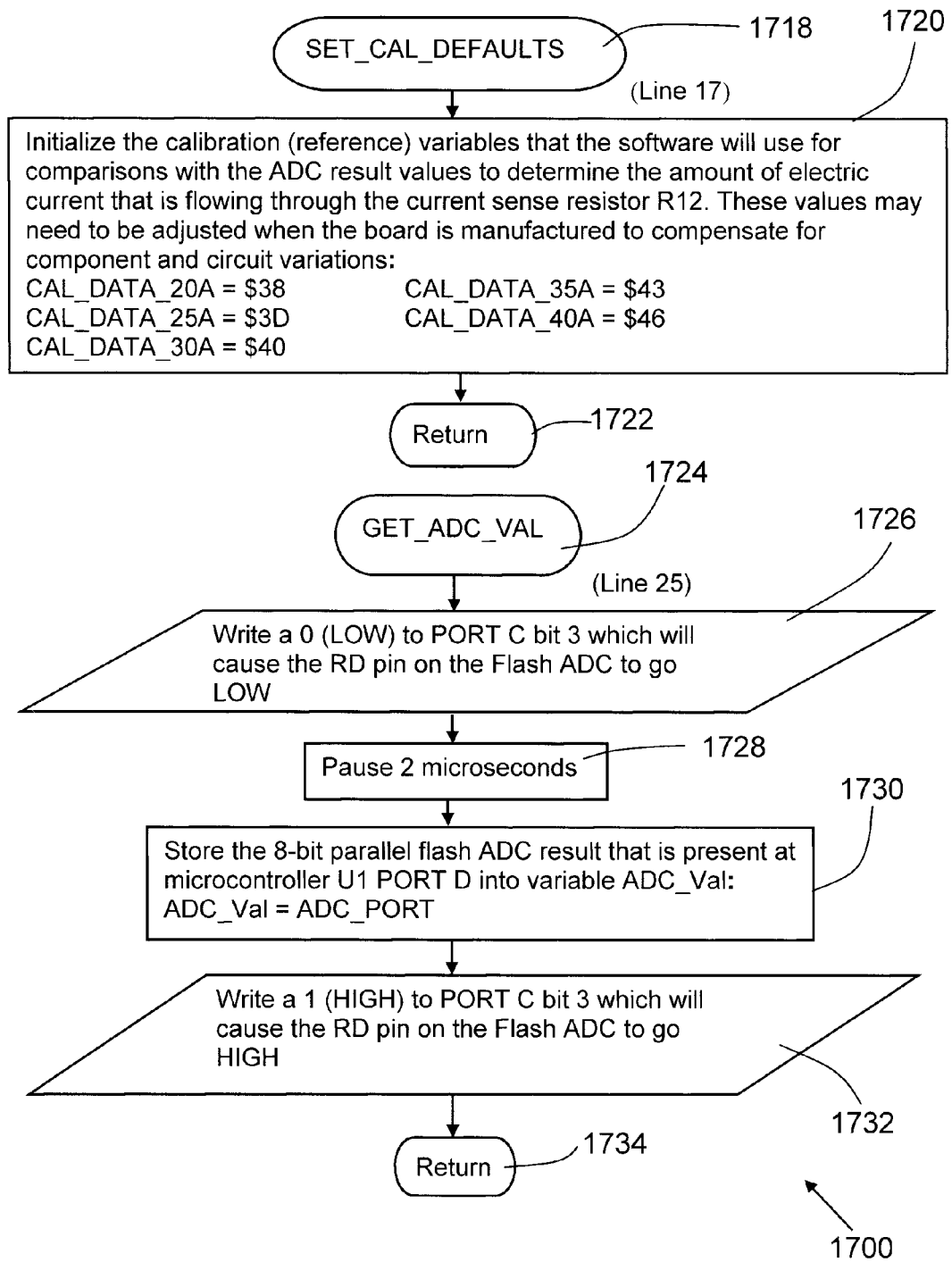
Figure 17C:
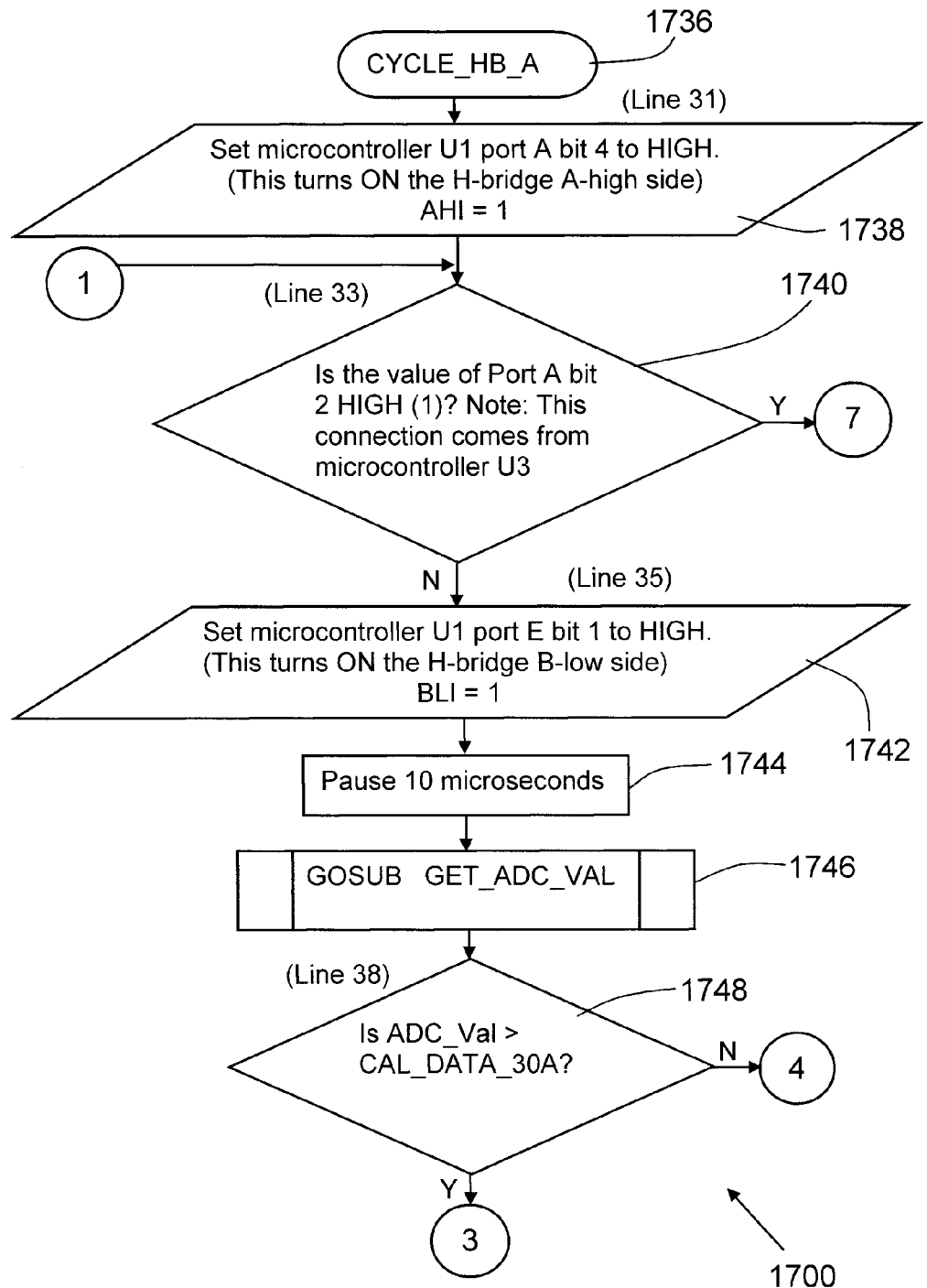
Figure 17D:
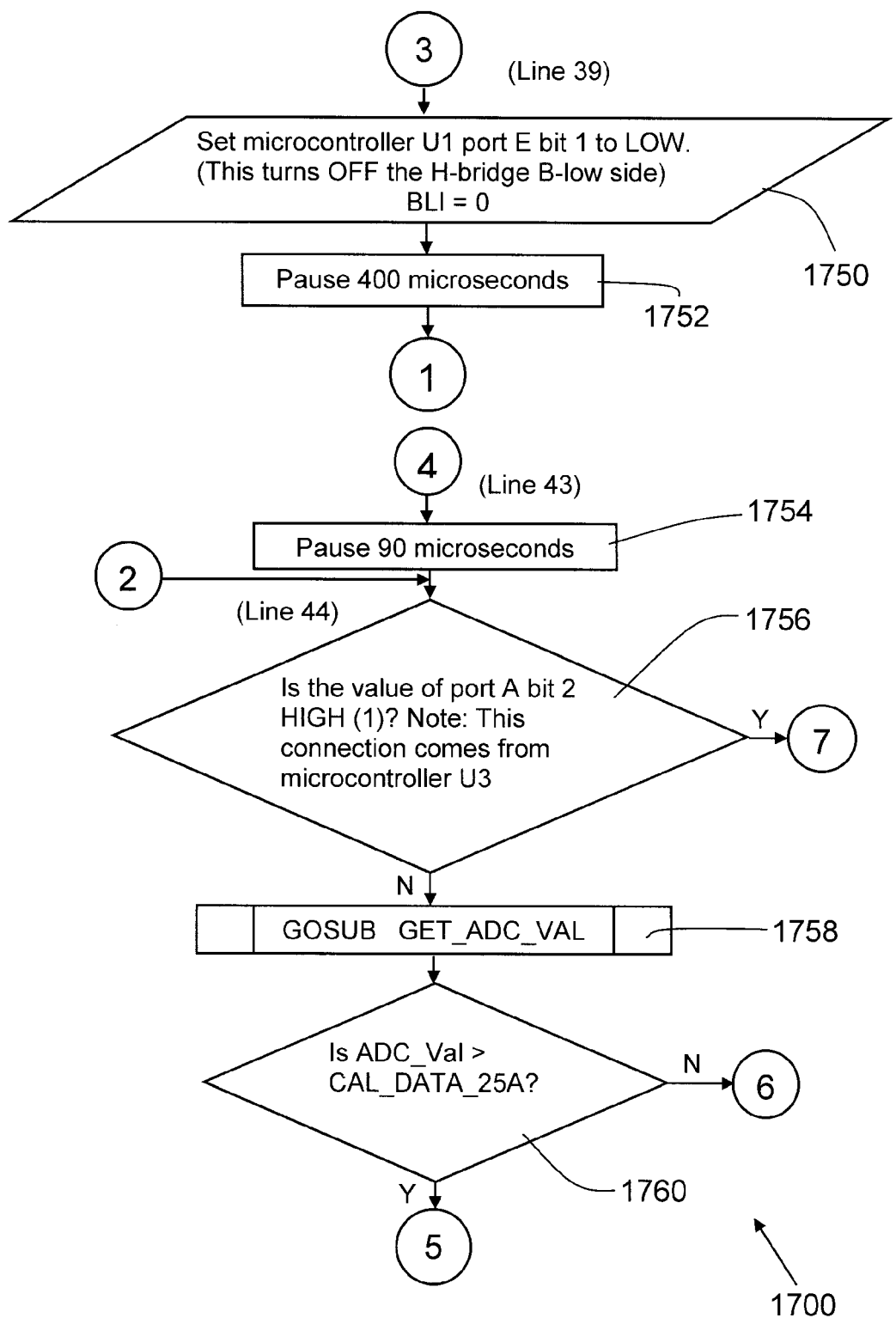
Figure 17E:
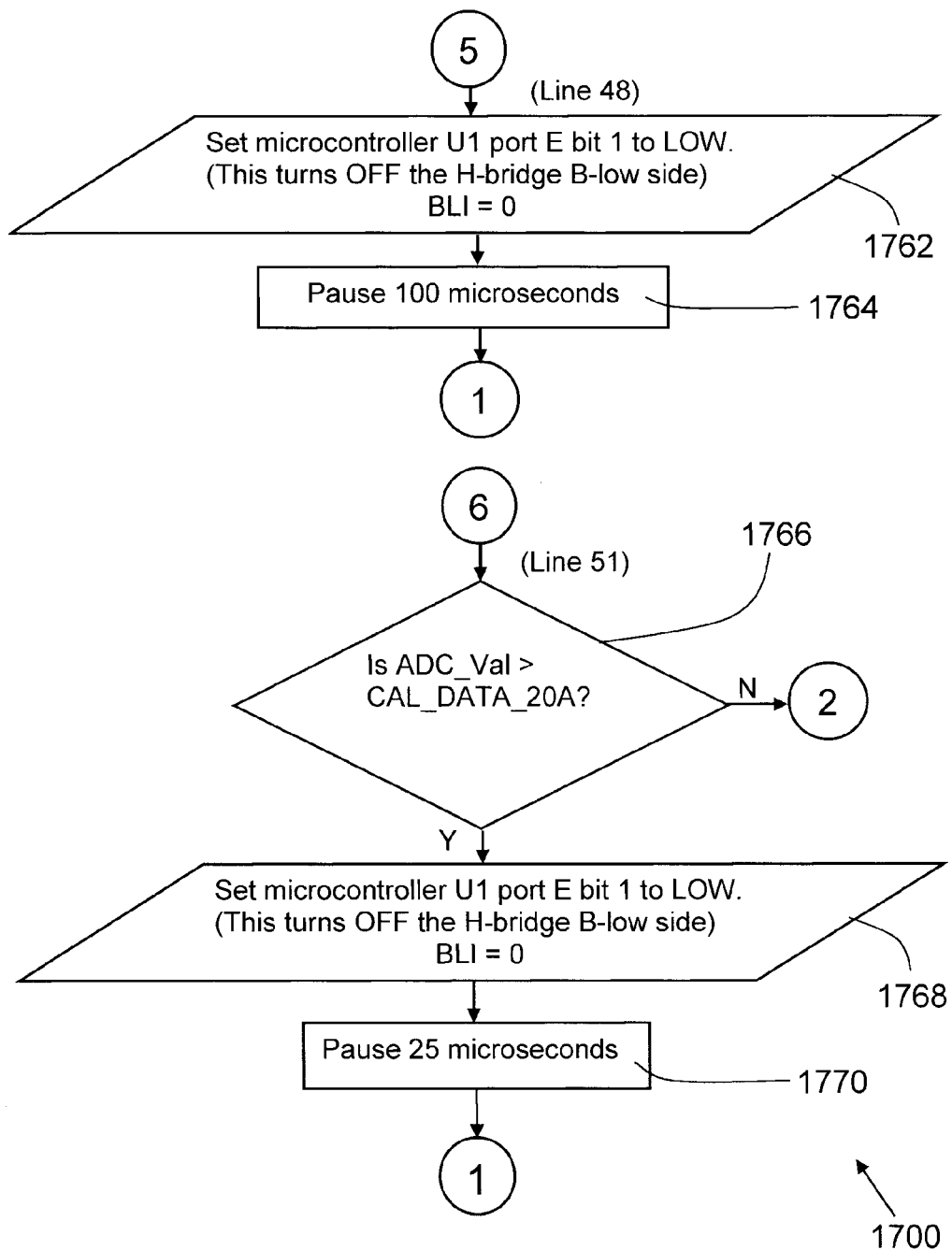
Figure 17F:
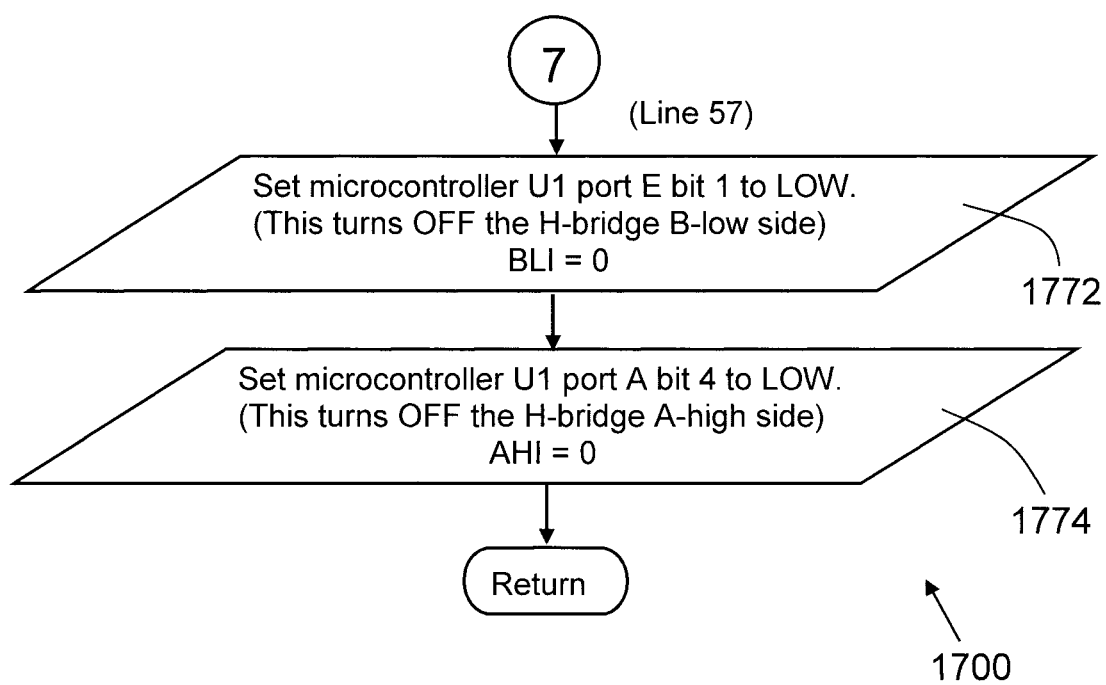
Figure 17G:
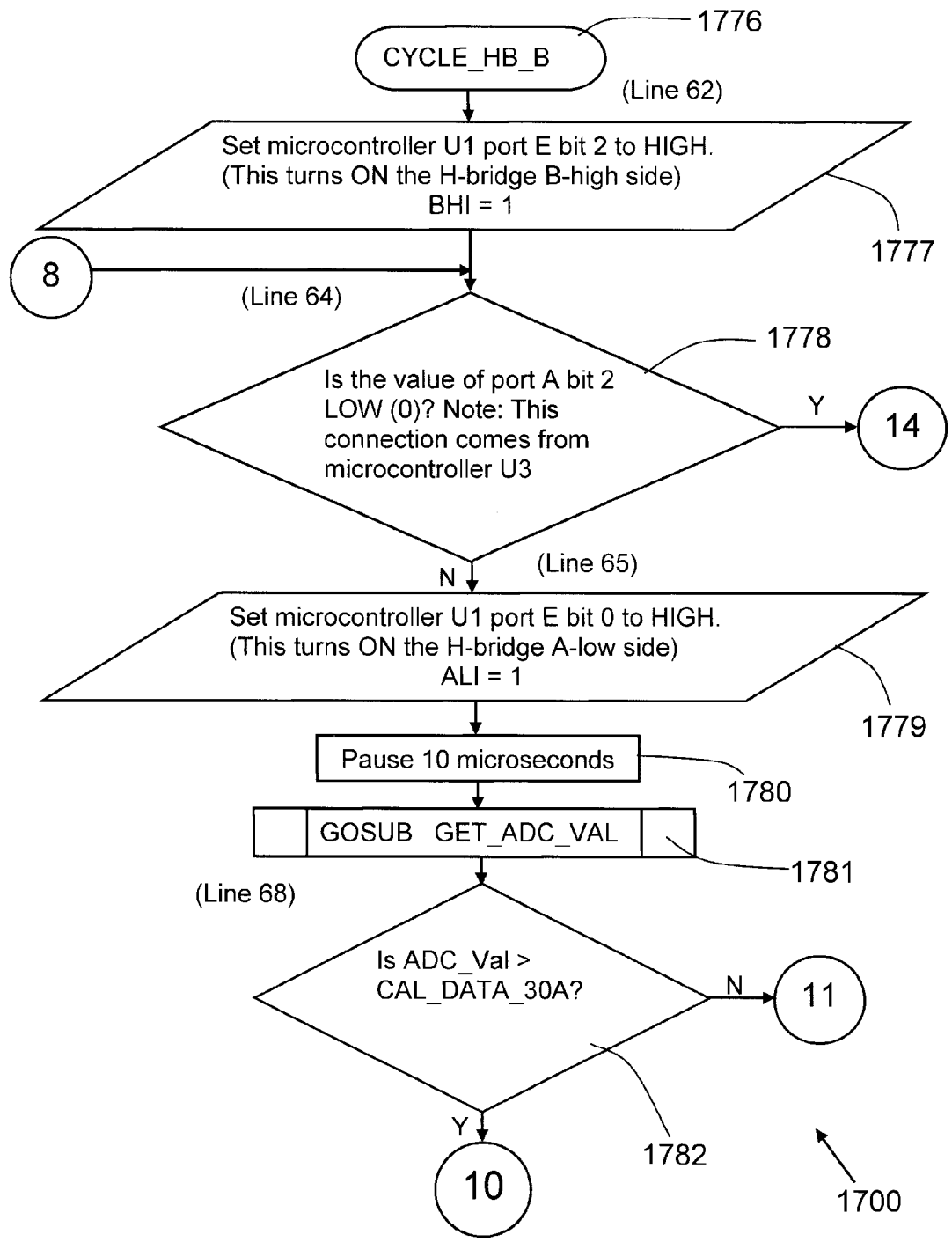
Figure 17H:
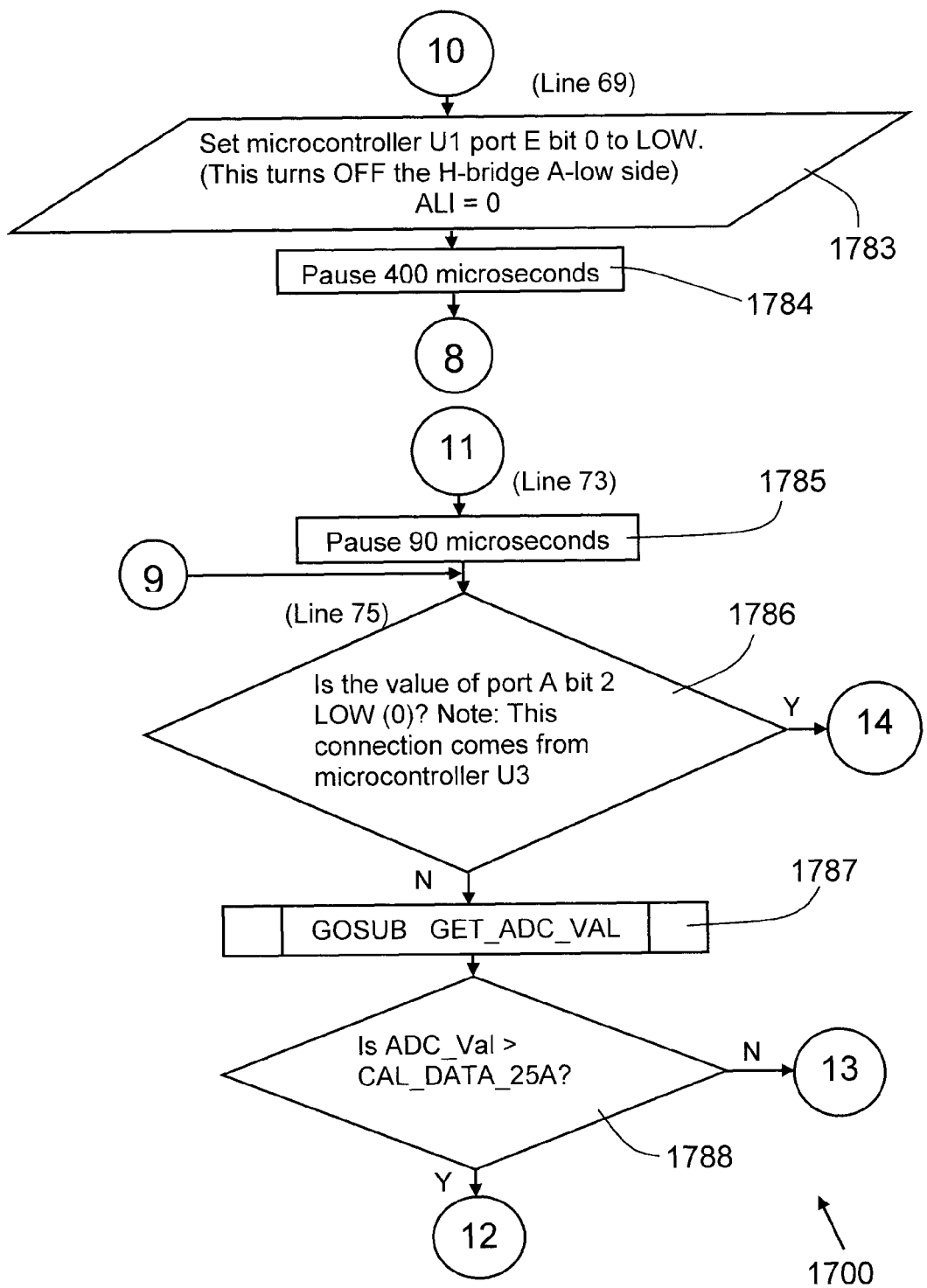
Figure 17I:
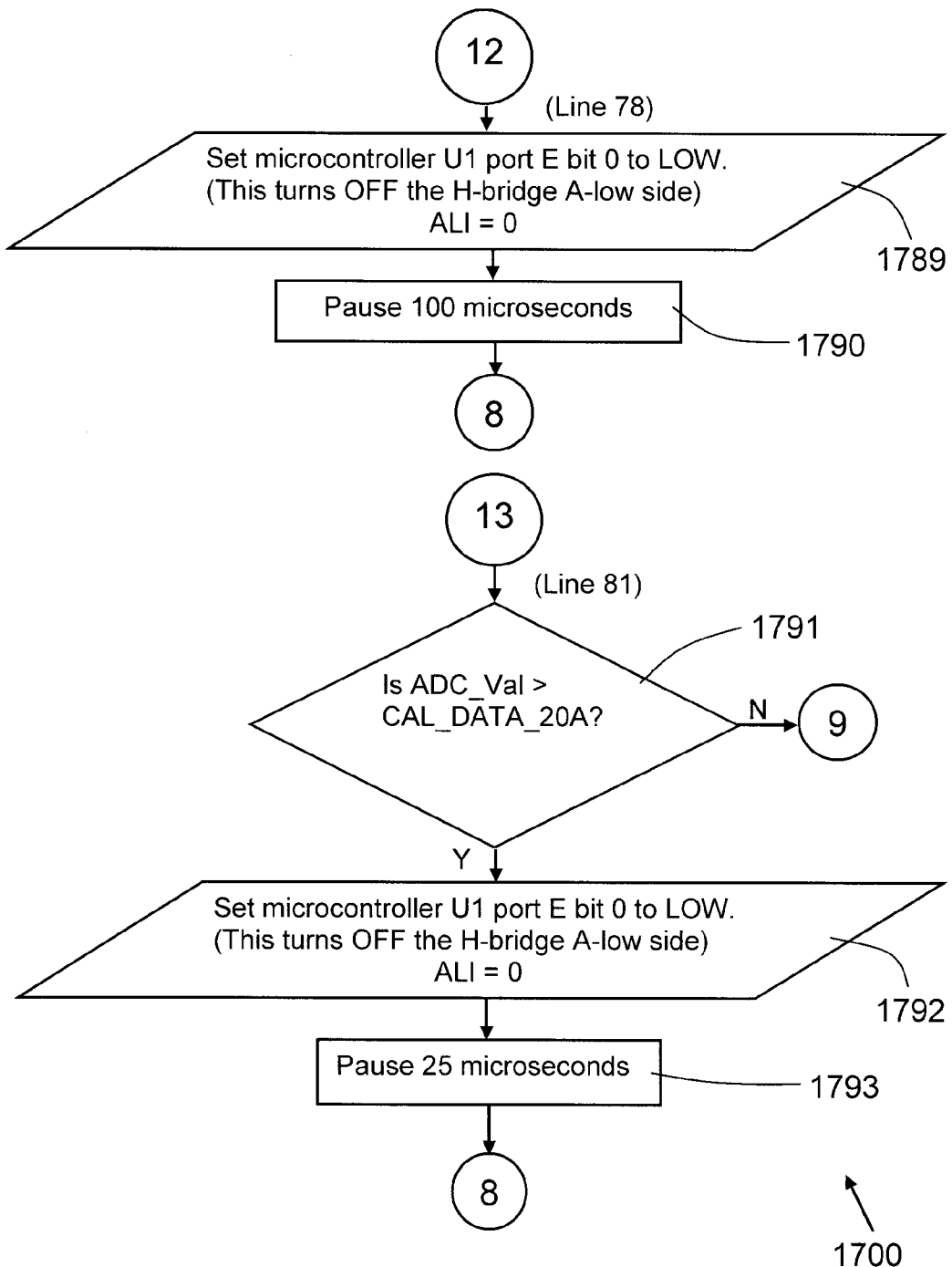
Figure 17J:
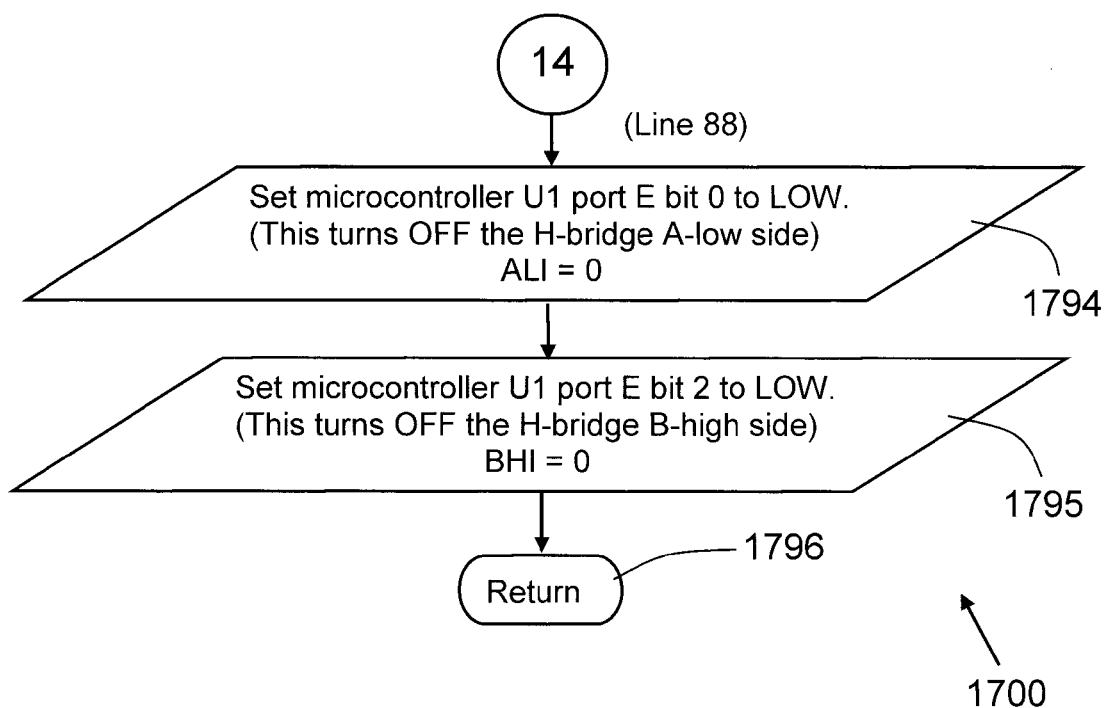
Figure 18A:
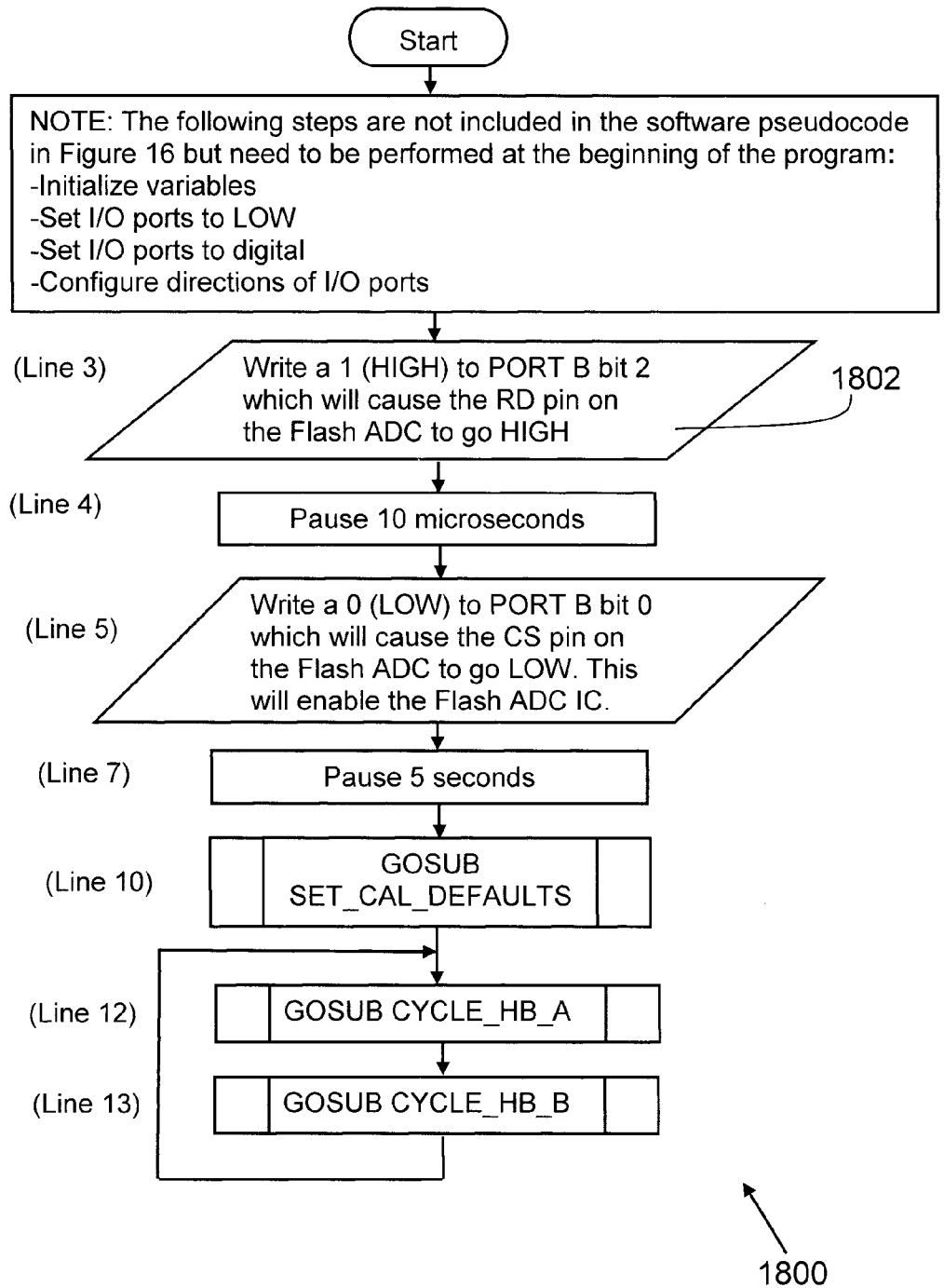
FIGS. 18A-18J illustrate a logic flow flowchart for an exemplary second embodiment of the power regulation system, in accordance with an embodiment of the present invention.
Figure 18B:
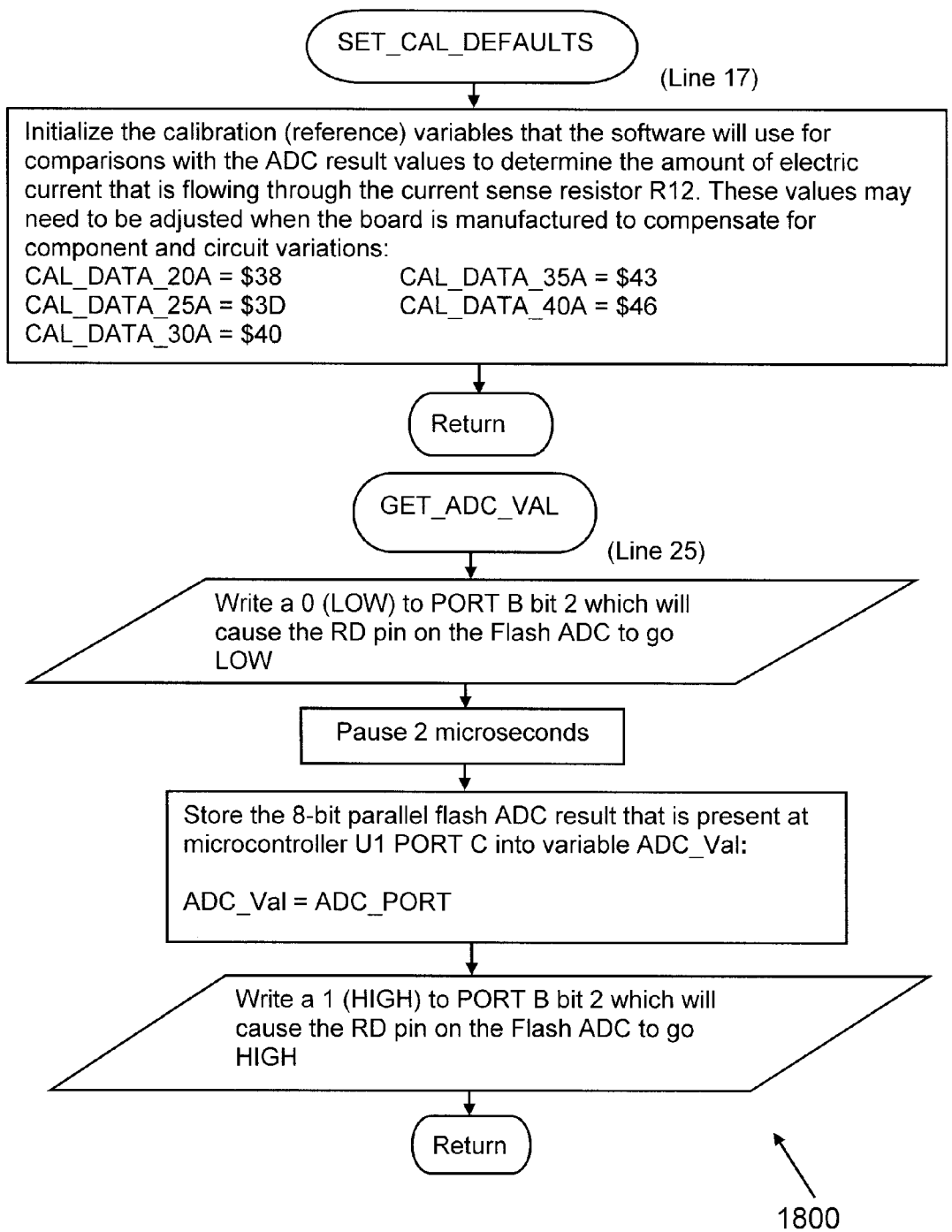
Figure 18C:
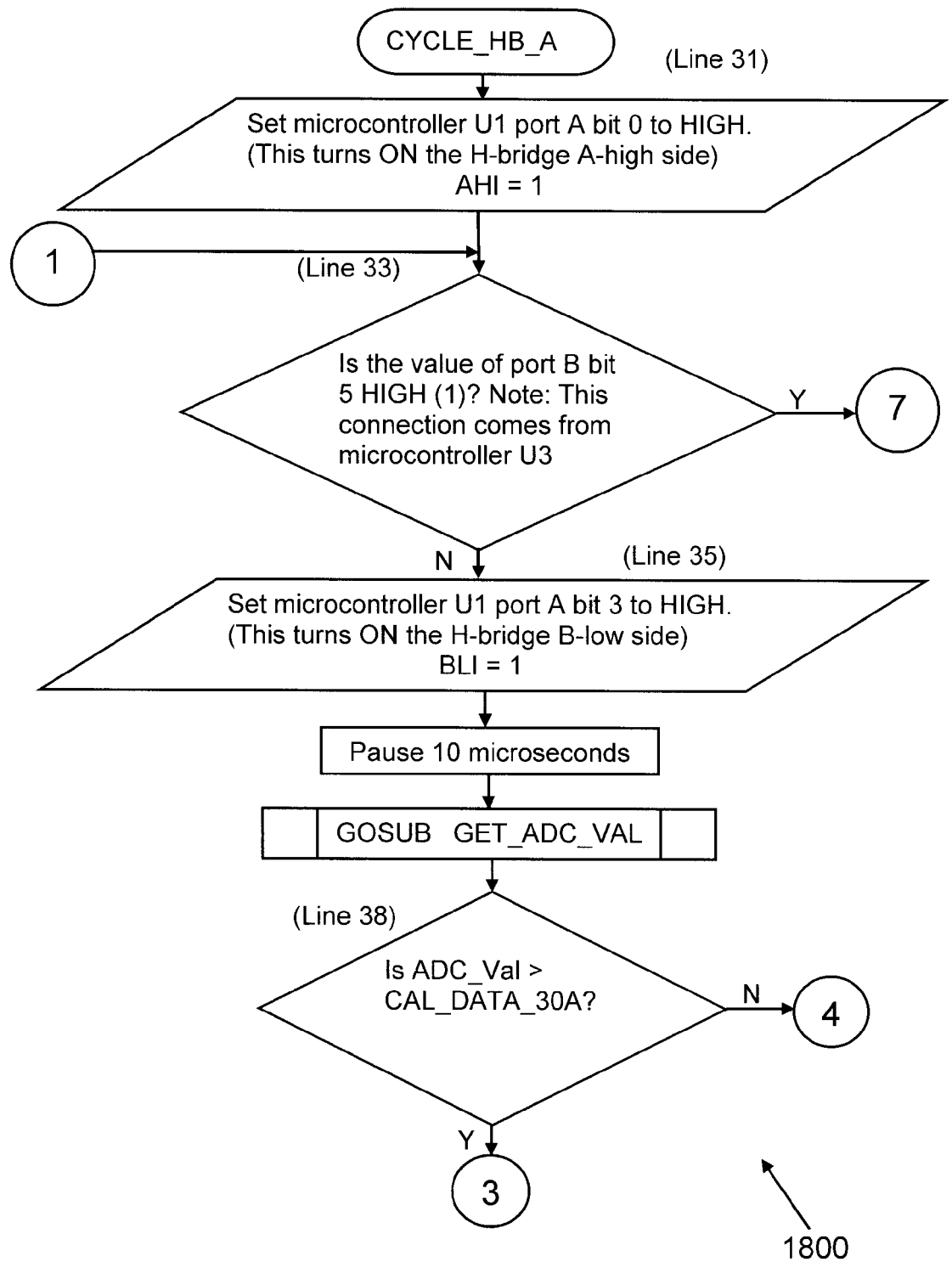
Figure 18D:
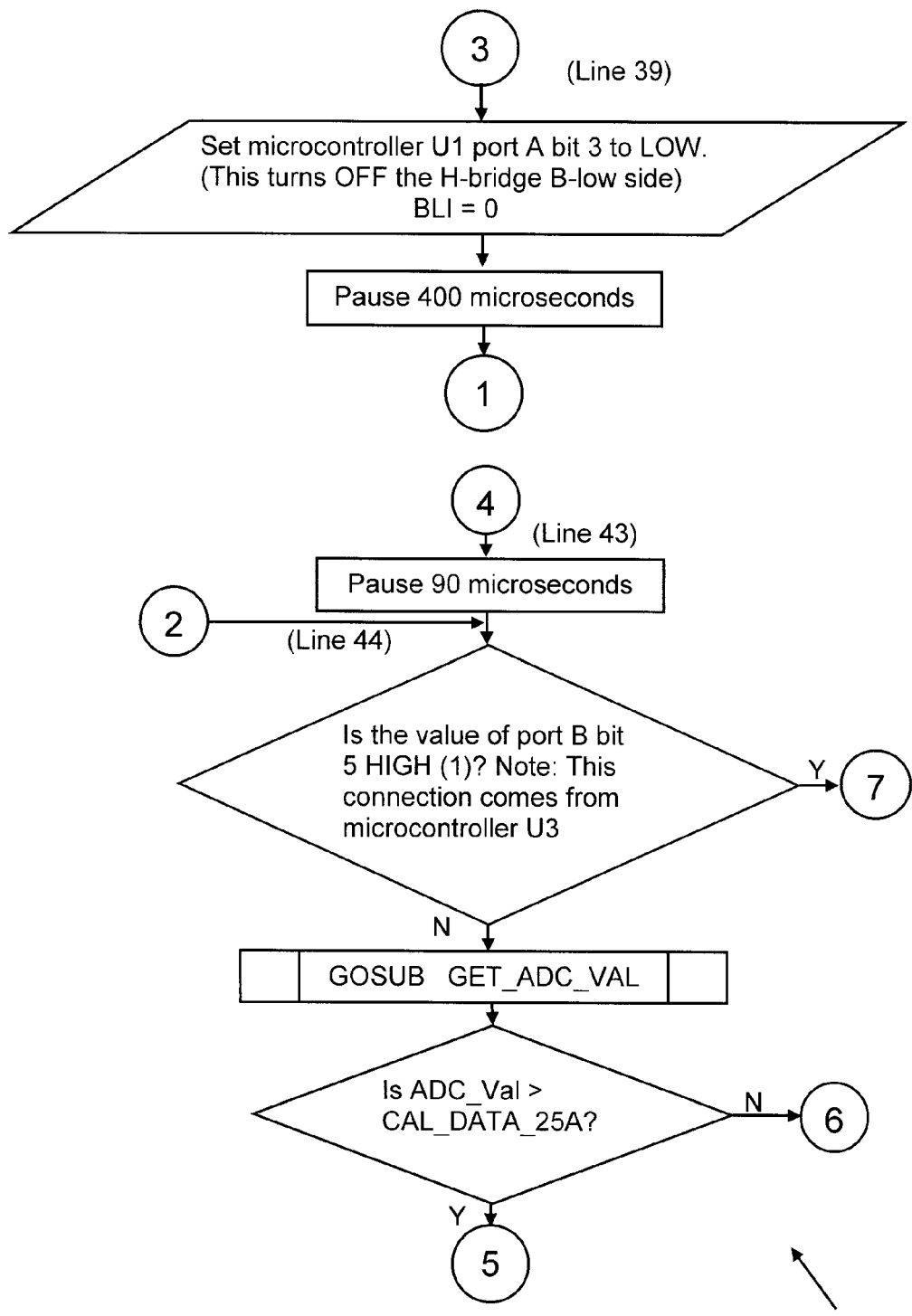
Figure 18E:
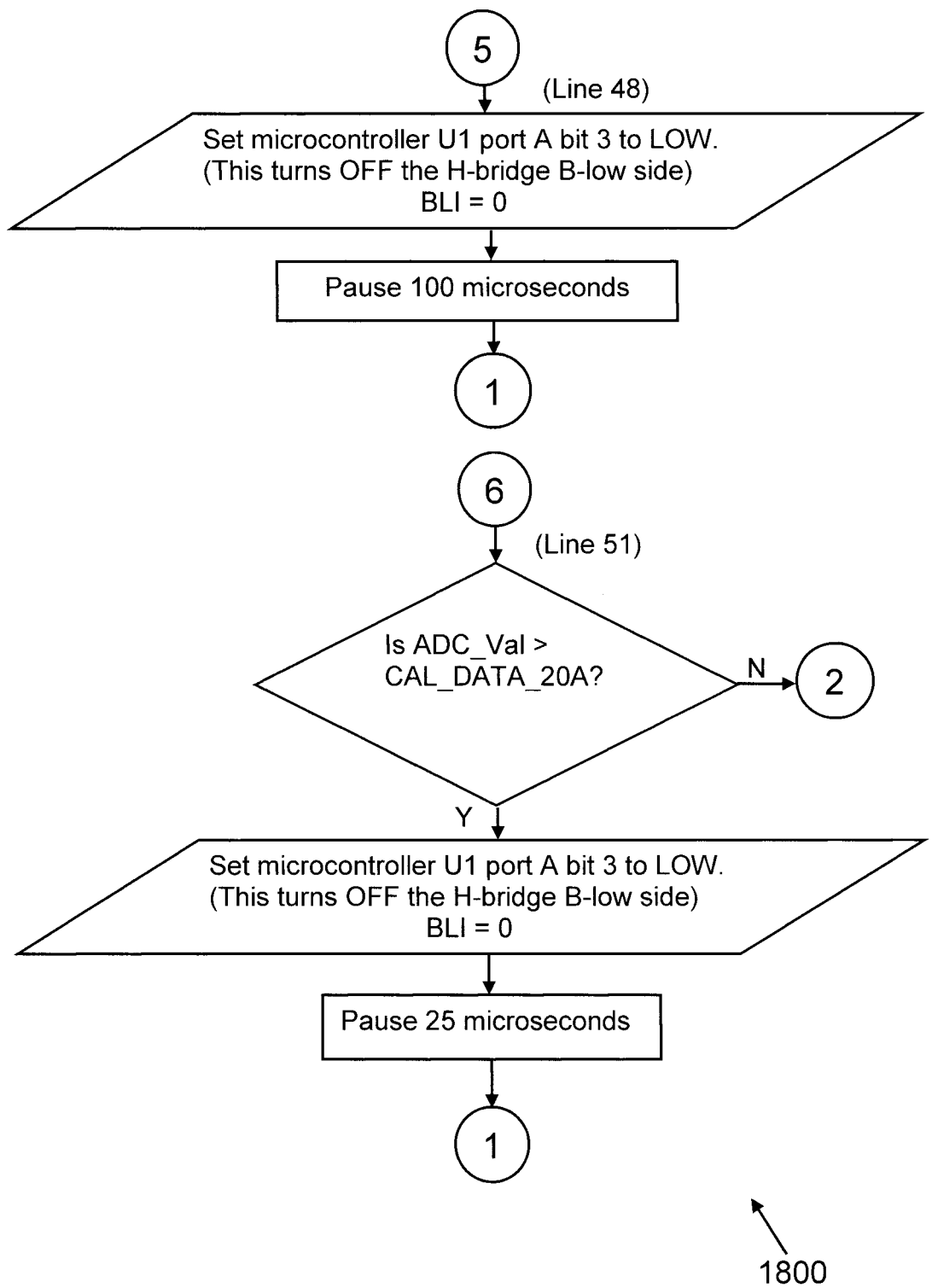
Figure 18F:
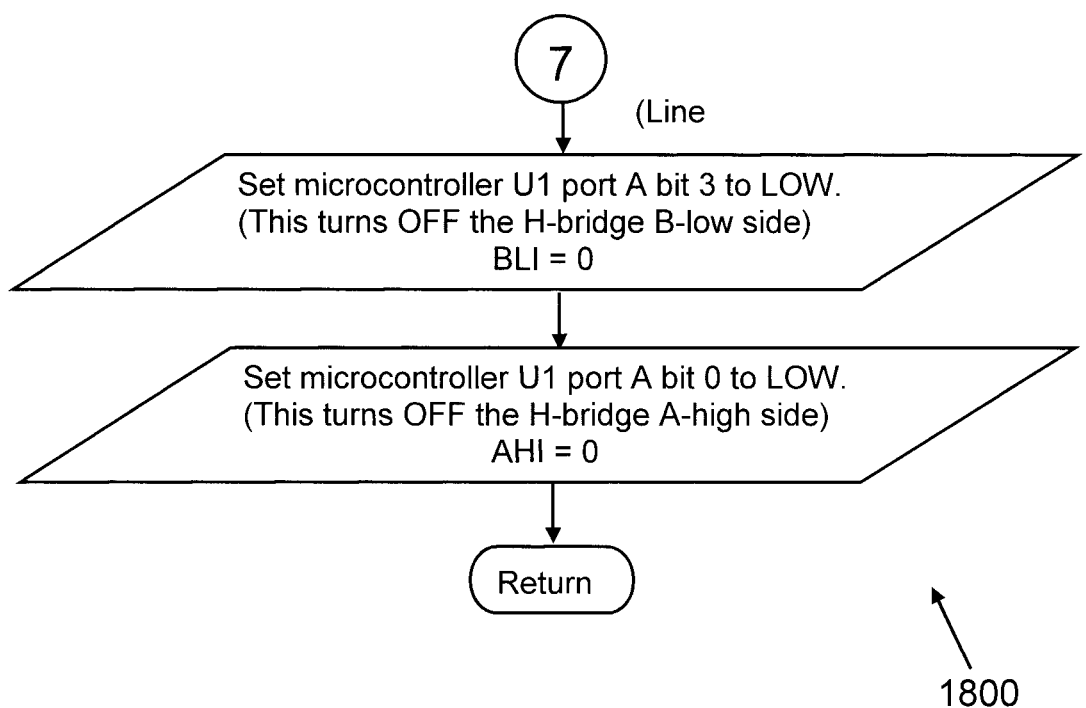
Figure 18G:
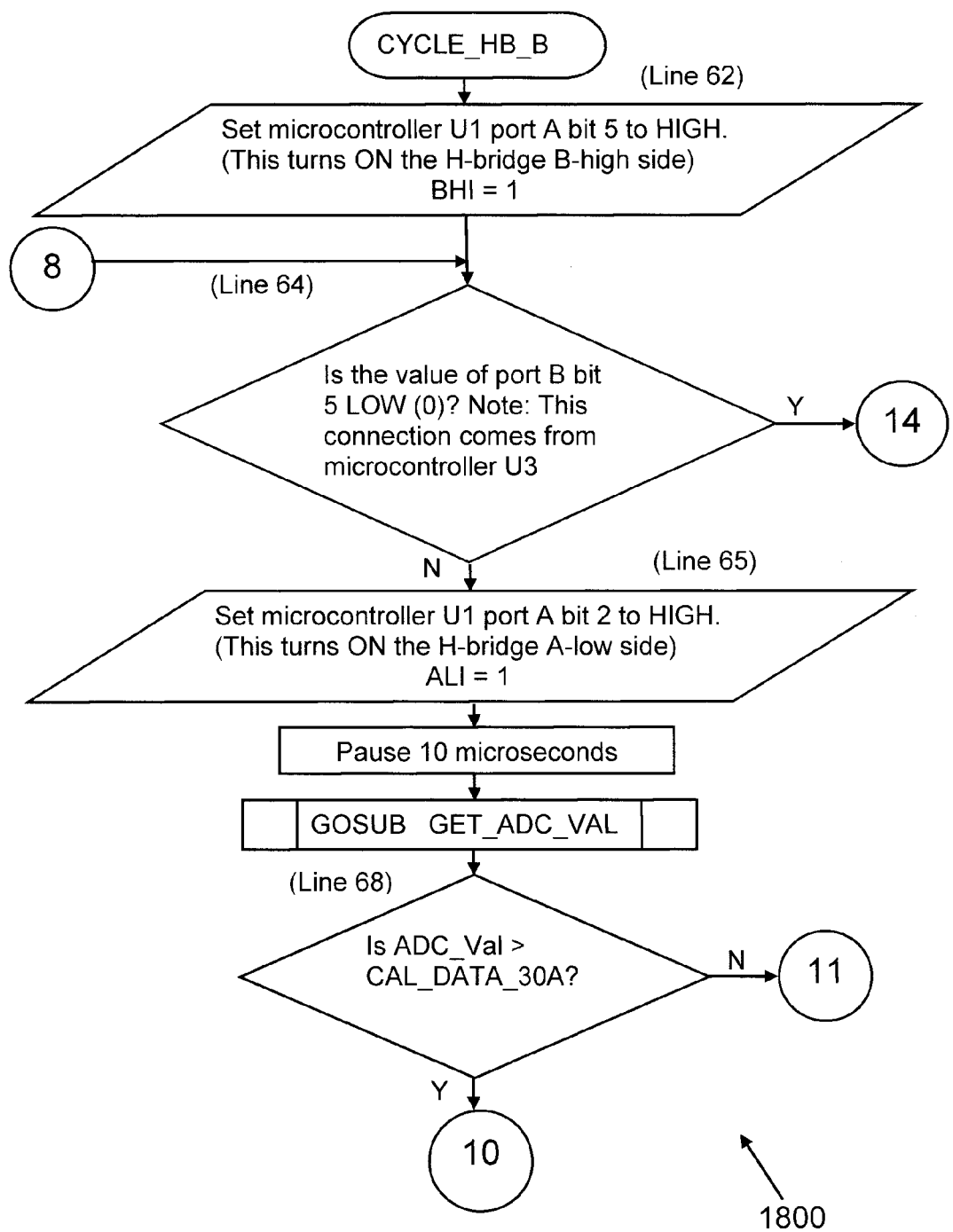
Figure 18H:
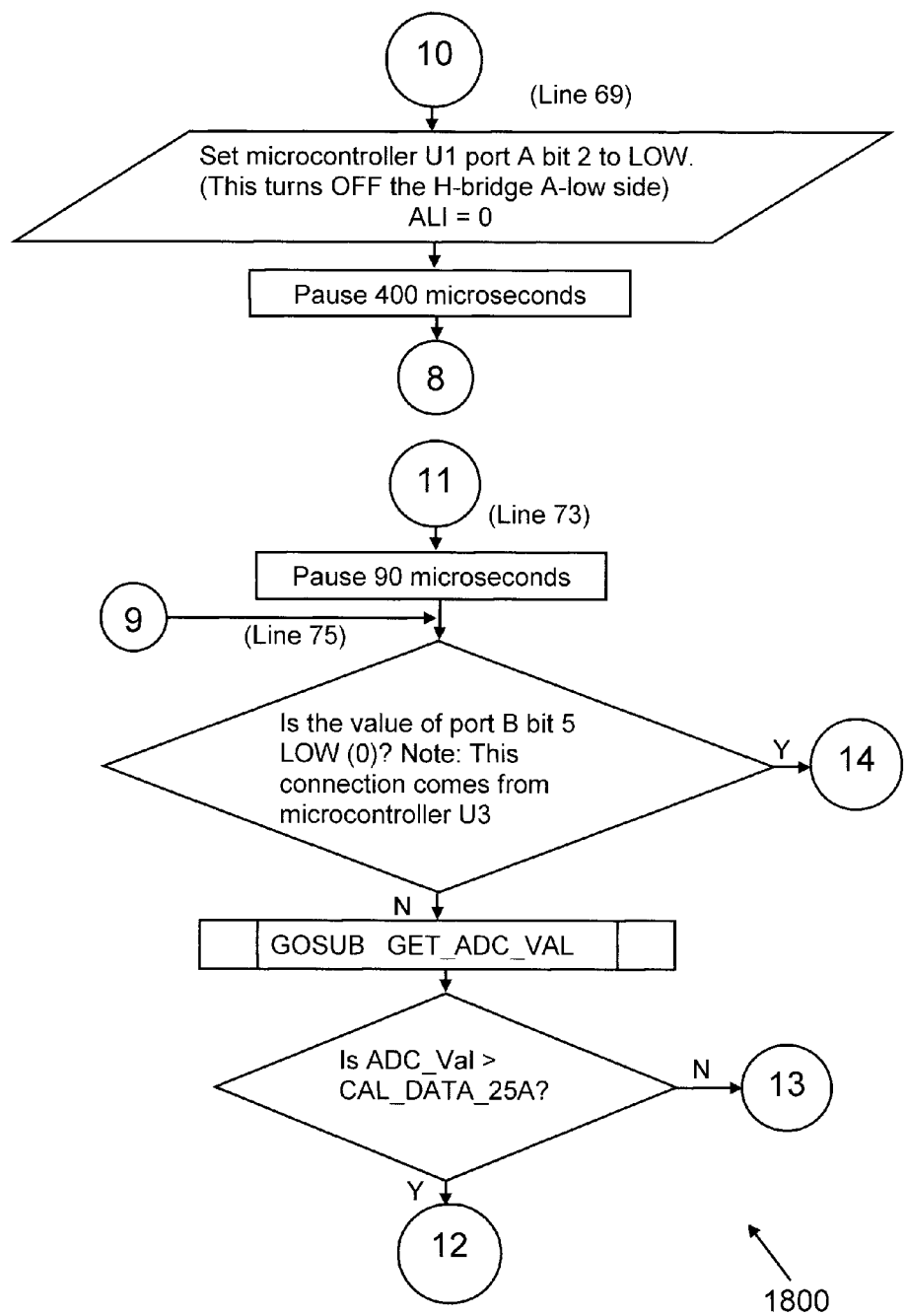
Figure 18I:
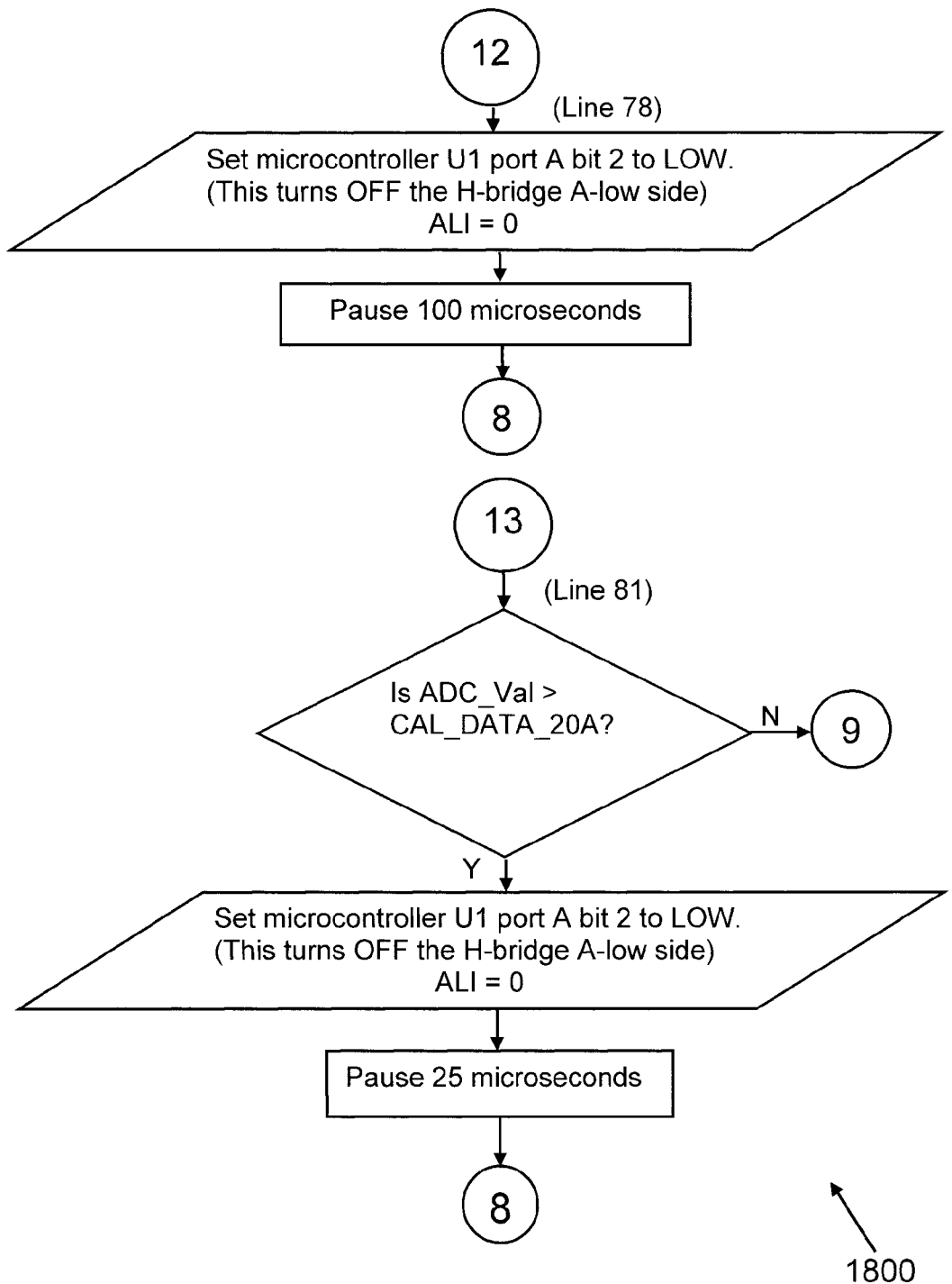
Figure 18J:
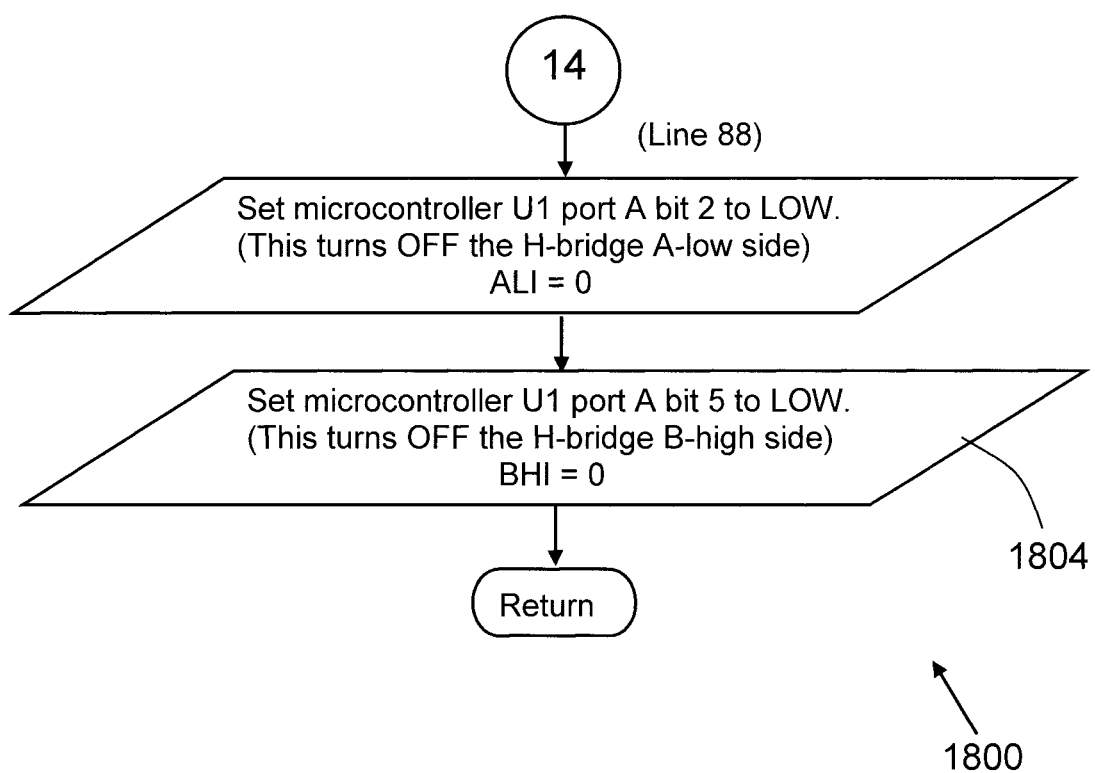

FIG. 15 illustrates a schematic diagram 1502 for the power distribution for an exemplary power regulation system, in accordance with an embodiment of the present invention. In the present embodiment, the power distribution may include a positive 5 volt regulator in the power regulation system. The voltage regulator U16 may convert the +12 volt supply voltage to the positive +5 volt power that may be used by components of the power regulation system. The input supply voltage to regulator U16 may not be limited to +12 volts DC; specifications of +5 volt voltage regulators may allow for wide ranges of input voltages, thus the input voltage supply to the regulator U16 or circuit 203 may be, for example, without limitation, +15 volts DC. The power distribution circuit shown in FIG. 10 may be used with the power regulation system shown in FIG. 1, whereas the power distribution circuit shown in FIG. 15 may be used with the streamlined power regulation system shown in FIG. 2. Although one regulator may supply enough electric current to drive circuit 103 or 203, the advantage of using two regulators instead of using one regulator may be that the heat that may be generated as a result of regulating the DC voltage may be distributed across multiple regulators, thus eliminating the need for a heat sink, for example.

FIG. 16 illustrates exemplary software 1600 written for an exemplary processor in PICBASIC language in accordance with an embodiment of the present invention. In the present embodiment, the software may provide instructions for regulating the power regulation system. The embedded software may be developed using a high-level programming language. The programming language or languages used to develop the embedded software may include a high-level language, including, without limitation, PICBASIC. However in other embodiments, other programming languages may be utilized. For example, without limitation, C or C++ programming languages may be used. Those skilled in the art, in light of the present teaching, will recognize that because processors, including the PIC16F887, may access 8-bit ports as easily and as efficiently as accessing 8-bit variables, realtime programming may require minimal coding and embedded software processing instructions may be efficiently written using a high level language, such as PICBasic©.

FIGS. 17A-17J illustrate a logic flow flowchart for an exemplary first embodiment of the power regulation system, in accordance with an embodiment of the present invention. In the present embodiment, the first embodiment logic flow flowchart 1700 may indicate a logical and sequential relationship between functions of the power regulation system. The logic flow flowchart may explain how to use the specific lengths, or values, of the delays that are performed by the software to decrease or increase the duty cycles of the pulse width modulated output to the H-bridge circuit in order to regulate the average current passed by the H-bridge circuit to no more than 20 amps. For example, without limitation, when the software detects a current greater than 30 amps, such as an ADC result greater than $40, a four hundred microsecond software delay may be performed. Those skilled in the art, in light of the present teachings will recognize that "$" indicates that the values may be hexadecimal, where the following calibration values may be used by the embedded software to relate the ADC results with the associated electric current amperage values: $3D represents 25 amps, $40 represents 30 amps, $43 represents 35 amps, and $46 represents 40 amps. In some embodiments, the reference/calibration values may be utilized by the embedded software when making comparisons with each of the current sense flash ADC device results to determine the amount of electric current that is flowing to the H-bridge circuit and to adjust the width of the pulses sent to the H-bridge circuit to indirectly control and regulate the electric current flowing through the H-bridge circuit. The embedded software may be expanded to accommodate additional reference/calibration values and/or additional ADC result comparisons which may provide more precise regulation of the average current flowing through the H Bridge.

The calibration data values may be determined through experimentation. The exemplary software pseudocode shown in FIG. 16 and the exemplary flowcharts shown in FIGS. 17 and 18 illustrate a subroutine named SET_CAL_DEFAULTS that assigns exemplary values to variables used to relate electric current amperage values with ADC result values in order to develop the PWM signals that will be sent to the H bridge in order to regulate the average current to no more than 20 AMPS. In order to regulate at different average current amperage levels, different calibration values may be required.

In one embodiment of the present invention, Step 1702 may include a "Start" subroutine that may include the main routine of the software in the processor. While not included in the psuedocode, additional steps may be performed during Step 1702, including, without limitation, initializing the variables, setting I/O ports to Low, setting I/O ports to digital, and configuring the directions of the I/O ports. Step 1704 may include writing a 1 (HIGH) to PORT C bit 3, which may cause an RD pin on a Flash ADC to go HIGH. Step 1706 may include pausing for ten microseconds. After the pause, Step 1708 may include writing a 0 (LOW) to PORT C bit 1 which may cause a CS pin on the Flash ADC to go LOW. Those skilled in the art, in light of the present teachings will recognize that Step 1708 may enable a Flash ADC IC. Step 1710 may include pausing for five seconds.

In one embodiment of the present invention, STEP 1712 may include calling in the subroutine "SET_CAL_DEFAULTS". "SET_CAL_DEFAULTS" may include values assigned to the reference variables that are used in duty cycle computations. In some embodiments, including Step 1714 and Step 1716, the software may then enter an infinite loop where the subroutines "CYCLE_HB_A" and "CYCLE_HB_B" may be called repeatedly, one after the other. Those skilled in the art, in light of the present teachings will recognize that Subroutines "CYCLE_HB_A" and "CYCLE_HB_B" may perform the same task, in that the subroutines may output "pulse width modulated" (PWM) signals to the H-bridge circuit based on results from the flash ADC device. In some embodiments, the difference between subroutines "CYCLE_HB_A" and "CYCLE_HB_B" may include that "CYCLE_HB_A" transmits PWM control signals to the H-bridge circuit that cause the electric current to flow in one direction through the H-bridge circuit, from B-low to A-high. However, in another embodiment, "CYCLE_HB_B" may transmit PWM control signals to the H-bridge circuit that cause the electric current to flow in the opposite direction, from A-low to B-high.

In one embodiment of the present invention, Step 1718 may allow the subroutine "SET_CAL_DEFAULTS" to assign the calibration, or reference, values to the reference variables that are used in duty cycle computations. In some embodiments, Step 1720 may include initializing the calibration variables that the software will use for comparisons with the ADC result values to determine the amount of electric current that flows through the current sense resister (R12). Certain values may require adjustment to compensate for component and circuit variations, including, without limitation, CAL_DATA_20A=$38, CAL_DATA_25A=$3D, CAL_DATA_30A=$40, CAL_DATA_35A=$43, and CAL_DATA_40A=$46. Step 1722 may include actuating a Return function.

In one embodiment of the present invention, Step 1724 may call the subroutine "GET_ADC_VAL" to cause the flash ADC device to perform an analog-to-digital conversion. In some embodiments, the subroutine may then capture the flash ADC device result into variable "ADC_Val". Those skilled in the art, in light of the present teaching, will recognize that the subroutines may include the minimum, or core subroutines that are required to regulate the electric current through the H-bridge circuit when the H-bridge circuit is driving the resistive-capacitive load. The reference, or calibration, value comparisons in the software may need to be adjusted depending on the maximum average electric current that is desired to flow through the H-bridge circuit. In some embodiments, Step 1726 may include writing a 0 (LOW) to PORT C bit 3 which may cause a RD pin on the Flash ADC to go LOW. Step 1728 may include pausing for two microseconds. Step 1730 may include storing the 8-bit parallel Flash ADC result that is present at processor PORT D into Variable ADC_Val. Next, Step 1732 may include writing a 1 (HIGH) to PORT C bit 3 which may cause a RD pin on the Flash ADC to go HIGH. Step 1734 may include actuating a Return function.

In one embodiment of the present invention, Step 1736 may include calling Subroutine "CYCLE_HB_A" for initiating analog-to-digital conversions, for processing ADC results, for outputting the PWM signal to the H bridge, and for monitoring the timer signal from the timing processor. Those skilled in the art, in light of the present teaching, will recognize that the timer signal from the timing processor may be used to notify each of the subroutines "CYCLE_HB_A" and "CYCLE_HB_B" when it is time to exit the subroutine to let the other subroutine run. In one embodiment, this notification may be necessary to cause the direction of the electric current in the H-bridge circuit to reverse direction. Those skilled in the art, in light of the present teaching, will recognize that reversing the electric current may be necessary when the H-bridge circuit is driving an electrolytic cell, in order to retard electroplating and to retard build-up on the electrode plates. In some embodiments, a timing processor may include embedded software with delay routines, including, without limitation, ninety second delays. The input-output processor may include embedded software that allows for interfacing and adapting the power regulation system to input-output requirements of different systems. In some embodiments, Step 1738 may include setting processor PORT A bit 4 to HIGH. Those skilled in the art, in light of the present teaching, will recognize that Step 1738 may power on the H-bridge circuit A-high side, AHI=1.

In one embodiment of the present invention, Step 1740 may include deciding if the value of port A bit 2 is HIGH (1). If Yes, move to Step 1772. If No, move to Step 1742, which includes setting processor PORT E bit 1 to HIGH. Step 1742 may turn ON H-bridge B-low side, BLI=1. Step 1744 may include pausing for ten microseconds. Step 1746 may utilize the subroutine "GET_ADC_VAL" to cause the flash ADC device to perform an analog-to-digital conversion. Step 1748 requires deciding if ADC_Val>CAL_DATA_30A. If No, move to Step 1754. If Yes, move to Step 1750, setting processor PORT E bit 1 to LOW. Step 1750 may turn OFF H-bridge B-low side, BLI=0. Step 1752 may include pausing for four hundred microseconds. If Step 1748 is No, then Step 1754 may include pausing for ninety microseconds. Step 1756 may include deciding if the value of port A bit 2 is HIGH (1). If Yes, move to Step 1772. If No, move to Step 1758, which may utilize the subroutine "GET_ADC_VAL" to cause the flash ADC device to perform an analog-to-digital conversion.

In one embodiment of the present invention, Step 1760 may include deciding if ADC_Val>CAL_DATA_25A. If No, move to Step 1766. If Yes, move to Step 1762, setting processor PORT E bit 1 to LOW. Step 1762 may turn OFF H-bridge B-low side, BLI=0. Step 1764 may include pausing for one hundred microseconds. In some embodiments, Step 1766 may include deciding if ADC_Val>CAL_DATA_20A. If No, move to Step 1756. If Yes, move to Step 1768, setting processor PORT E bit 1 to LOW to turn OFF the H-bridge B-low side, BLI=0. Step 1770 may include pausing for twenty five microseconds. Step 1772 involves, once again, setting processor PORT E bit 1 to LOW to turn OFF the H-bridge B-low side, BLI=0. Step 1774 may include setting processor PORT A bit 4 to LOW to turn OFF the H-bridge A-high side, AHI=0.

In one embodiment of the present invention, Step 1776 may include calling Subroutine "CYCLE_HB_B" for initiating analog-to-digital conversions, for processing ADC results, for outputting the PWM signal to the H bridge, and for monitoring the timer signal from the timing processor. In a next Step 1777, processor PORT E bit 2 may be set to HIGH to turn ON the H-bridge B-high side, BHI=1. Those skilled in the art, in light of the present teaching, will recognize that the connection originates from timing processor. Step 1778 may include deciding if the value of port A bit 2 is LOW (0). If Yes, move to Step 1794. If No, move to Step 1779, setting processor PORT E bit 0 to HIGH to turn ON the H-bridge A-low side, ALI=1. In some embodiments, Step 1780 may include pausing ten microseconds. Step 1781 may then include calling the subroutine "GET_ADC_VAL" to cause the flash ADC device to perform an analog-to-digital conversion. Step 1782 may include deciding if ADC_Val>CAL_DATA_30A. If No, move to Step 1785. If Yes, move to Step 1783, setting processor PORT E bit 0 to LOW to turn OFF H-bridge A-low side. Step 1784 may include pausing for four hundred microseconds.

In one embodiment of the present invention, Step 1785 may include pausing for ninety microseconds. Step 1786 may include deciding if the value of port A bit 2 LOW (0). If Yes, move to Step 1794. If No, move to Step 1787, calling the subroutine "GET_ADC_VAL" to cause the flash ADC device to perform an analog-to-digital conversion. Step 1788 may include deciding if ADC_Val>CAL_DATA_25A. If No, move to Step 1791. If Yes, move to Step 1789, setting processor PORT E bit 0 to LOW to turn OFF H-bridge A-low side, ALI=0. Step 1790 may include pausing 100 microseconds. Step 1791 may include deciding if ADC_Val>CAL_DATA_20A. If No, returning to Step 1786. If Yes, move to Step 1792, setting processor PORT E bit 0 to LOW to turn OFF H-bridge A-low side, ALI=0. Step 1793 may include pausing twenty-five microseconds. Step 1794 may include setting processor PORT E bit 0 to LOW to turn OFF H-bridge A-low side, ALI=0. Step 1795 may include setting processor PORT E bit 2 to LOW to turn OFF H-bridge B-high side, BHI=0. Finally, Step 1796 may terminate the logic flow flowchart by actuating the Return function.

FIGS. 18A-18J illustrate a logic flow flowchart for an exemplary second embodiment of the power regulation system, in accordance with an embodiment of the present invention. In the present embodiment, the second embodiment logic flow flowchart 1800 may indicate a logical and sequential relationship between functions of the power regulation system, similar to the first embodiment. However, the second embodiment may include a more basic, streamlined logic flow. In some embodiments, the second embodiment logic flow flowchart may actuate the Flash ADC device slightly different. In some embodiments, the second embodiment logic flow flowchart may set the processor to different variables, for example, without limitation, an initial Step 1802 may write a 1 (HIGH) to PORT B bit 2 to cause the RD pin on the Flash ADC to go HIGH, whereas Step 1704, while similar, may include writing a 1 (HIGH) to PORT C bit 3, which may cause an RD pin on a Flash ADC to go HIGH.

In some embodiments, the second embodiment logic flow flowchart may set the processor to different variables, for example, without limitation, a final Step 1804 may include, without limitation, setting processor PORT A bit 5 to LOW to turn OFF H-bridge B-high side, BHI=0, whereas Step 1795 sets the processor PORT E bit 2 to LOW to turn OFF H-bridge B-high side, BHI=0.

In one alternative embodiment of the present invention, the protection circuitry (R9, D10, D11, and D12) at the input of the operational amplifier U5 may be omitted if the analog current sense input signal can be guaranteed not to exceed the input limits of the operational amplifier. Those skilled in the art, in light of the present teachings will recognize that various types of flash ADC devices may be used, or the internal ADC devices in the processor may be used to perform the analog-to-digital conversion. In yet another alternative embodiment, a timer integrated circuit, instead of the timer processor may be accessed by the processor and the input-output processor to manage long term delay operations, including ninety seconds. In yet another embodiment, timer interrupts inside the processor and the input-output processor may be used by the embedded software in the processors to manage long term delay operations.

Figure 19:
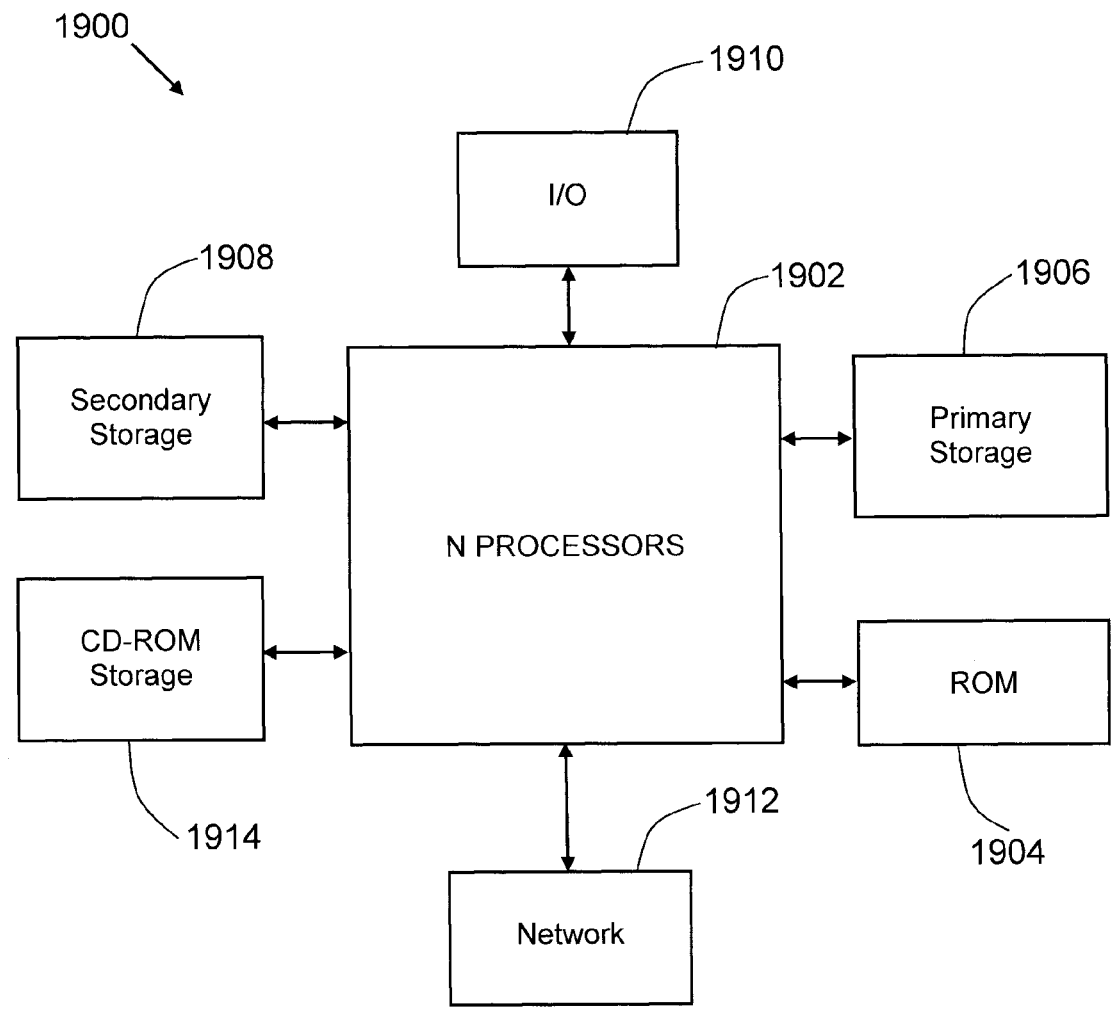
FIG. 19 illustrates a typical computer system that, when appropriately configured or designed, can serve as a computer system in which the invention may be embodied, in accordance with an embodiment of the present invention.

FIG. 19 illustrates a typical computer system that, when appropriately configured or designed, can serve as a computer system in which the invention may be embodied. The computer system 1900 includes any number of processors 1902 (also referred to as central processing units, or CPUs) that are coupled to storage devices including primary storage 1906 (typically a random access memory, or RAM), primary storage 1904 (typically a read only memory, or ROM). CPU 1902 may be of various types including microcontrollers (e.g., with embedded RAM/ROM) and microprocessors such as programmable devices (e.g., RISC or SISC based, or CPLDs and FPGAs) and unprogrammable devices such as gate array ASICs or general purpose microprocessors. As is well known in the art, primary storage 1904 acts to transfer data and instructions uni-directionally to the CPU and primary storage 1906 is used typically to transfer data and instructions in a bi-directional manner. Both of these primary storage devices may include any suitable computer-readable media such as those described above. A mass storage device 1908 may also be coupled bi-directionally to CPU 1902 and provides additional data storage capacity and may include any of the computer-readable media described above. Mass storage device 1908 may be used to store programs, data and the like and is typically a secondary storage medium such as a hard disk. It will be appreciated that the information retained within the mass storage device 1908, may, in appropriate cases, be incorporated in standard fashion as part of primary storage 1906 as virtual memory. A specific mass storage device such as a CD-ROM 1914 may also pass data uni-directionally to the CPU.

CPU 1902 may also be coupled to an interface 1910 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1902 optionally may be coupled to an external device such as a database or a computer or telecommunications or internet network using an external connection as shown generally at 1912, which may be implemented as a hardwired or wireless communications link using suitable conventional technologies. With such a connection, it is contemplated that the CPU might receive information from the network, or might output information to the network in the course of performing the method steps described in the teachings of the present invention.

All the features or embodiment components disclosed in this specification, including any accompanying abstract and drawings, unless expressly stated otherwise, may be replaced by alternative features or components serving the same, equivalent or similar purpose as known by those skilled in the art to achieve the same, equivalent, suitable, or similar results by such alternative feature(s) or component(s) providing a similar function by virtue of their having known suitable properties for the intended purpose. Thus, unless expressly stated otherwise, each feature disclosed is one example only of a generic series of equivalent, or suitable, or similar features known or knowable to those skilled in the art without requiring undue experimentation.

Having fully described at least one embodiment of the present invention, other equivalent or alternative methods of regulating current to an electrolytic cell according to the present invention will be apparent to those skilled in the art. The invention has been described above by way of illustration, and the specific embodiments disclosed are not intended to limit the invention to the particular forms disclosed. For example, the particular implementation of the programming code may vary depending upon the particular type processor, ADC and H-bridge used. The techniques and circuitry described in the foregoing were directed to controlling a particular H-bridge circuit implementation; however, similar techniques are applicable to similar switched controller implementations of the present invention and are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. An apparatus comprising:
    an H-bridge circuit device, in which said H-Bridge comprising a control signal receiver, wherein said H-bridge circuit device being configured to apply power to an electrical load;
    a power supply, said power supply being configured to supply said power applied to said electrical load; and
    a circuit board, in which said circuit board comprising at least one programmable circuit board, wherein said programmable circuit board being configured to process a current sense for substantially controlling and regulating a current flow into said H-bridge circuit device while said H-bridge circuit device applies power to said electrical load, said at least one programmable circuit board comprising;
        a current sense device being configured to sense an amount of current being supplied to said H-bridge circuit device, said current sense device producing an analog signal feedback indicative of said sensed current;
        a current sense signal limiting and amplification device being configured to at least one of limit and amplify said analog signal feedback;
        an analog-to-digital conversion device in serial communication with said current sense signal limiting and amplification device, said analog-to-digital conversion device being configured to convert said analog signal feedback from said current sense signal limiting and amplification device, from an analog signal feedback to a digital signal feedback, representative of said sensed current and output said digital signal feedback;
        a first processor device, in which said first processor device comprising a feedback processing microcontroller, wherein said feedback processing microcontroller is in parallel communication with said analog-to-digital conversion device being configured to at least receive said digital signal feedback, wherein said feedback processing microcontroller being configured to process at least a portion of said digital signal feedback and output at least one control signals to said H-bridge circuit device based on an amplitude or amperage of said digital signal feedback, and wherein at least a portion of said control signals being pulse width modulated; and
        a software component, in which said software component comprising at least one software component embedded in a non-transitory computer readable medium of said programmable circuit board, wherein said software component instructs said feedback processing microcontroller to process said digital signal feedback from said analog-to-digital conversion device, and in which said software component further instructs said feedback processing microcontroller to adjust a duty cycle of said pulse width modulated control signal based on said amplitude or amperage of said digital signal feedback to generally ensure that said supplied power flowing through said H-Bridge circuit device does not exceed a maximum capacity of said H-Bridge circuit device and, thereby, mitigate damage to said H-Bridge circuit device or mitigate power failure to said electrical load.

2. The apparatus as recited in claim 1, in which said current sense device further comprises a current sense resistor in series with a negative supply voltage of said H-bridge circuit device, and in which said apparatus further comprising a heat sink external to said circuit board for mounting said current sense resistor, and in which said analog-to-digital conversion device comprises a flash ADC for a faster conversion time, a faster access time, and a higher throughput feedback for said processing microcontroller to process.

3. The apparatus as recited in claim 1, in which said programmable circuit board further comprising a timer processor in communication with said first processor, in which said timer processor comprising a programmable timer, wherein said timer processor being configured to generate timing intervals for longer time period of operation, wherein said timer processor is further configured to lessen long delay errors.

4. The apparatus as recited in claim 1, in which said programmable circuit board further comprising an optical isolation device in parallel communication with said first processor, in which said optical isolation device being configured to communicate isolated control signals to said H-bridge circuit device, and wherein said optical isolation device being configured to isolate a negative voltage ground and control signal of said first processor from a negative voltage ground and control signal receiver of said H-bridge circuit, wherein an output control signal level of said optical isolation device is an isolated control signal level for output to said H-bridge circuit device.

5. The apparatus as recited in claim 1, in which said programmable circuit board further comprising an input-output processor being configured to at least interface said first processor with an external devices.

6. The apparatus as recited in claim 1, in which said electrical load comprises at least one of a resistive-capacitive load, a resistive load, a capacitive load, and an inductive load, and in which said electrical load further comprises at least one of an electrolytic cell, an electrochemical cell, a galvanized cell, a battery, and a motor controller.

7. The apparatus as recited in claim 6, in which said electrolytic cell comprises at least one axial flow electrolytic cell, wherein said duty cycle of said pulse width is adjusted to charge said electrolytic cell to a predetermined voltage level and maintain the electrolytic cell voltage to said predetermined voltage level, and in which said motor controller comprises a DC motor controller, wherein said H-bridge circuit device is configured to apply power to said at least one of electrolytic cell and motor controller in a plurality of directions.

8. A system comprising:
a first storage tank, said first storage tank comprising at least one first storage tank being configured to retain a quantity of waste water;
a pump unit being configured to draw waste water from said first storage tank;
an electrolytic cell, said electrolytic cell comprising at least one electrolytic cell in communication with said pump unit, wherein said electrolytic cell comprising at least two electrodes configured to be submersed in the flow of the waste water, and wherein said electrodes being configured to accept power in an electrolysis process to at least substantially purify the waste water;
a second storage tank, said second storage tank comprising at least one second storage tank being configured to retain said processed waste water; and
a regulated power source being configured to supply regulated power to said electrolytic cell, said regulated power source at least comprising:
an H-bridge circuit device, in which said H-Bridge comprising a control signal receiver, wherein said H-bridge circuit device being configured to apply said regulated power to said electrolytic cell;
a current sense device being configured to sense an amount of current being supplied to said H-bridge circuit device, said current sense device producing an analog signal feedback indicative of said sensed current;
a current sense signal limiting and amplification device being configured to at least one of limit and amplify said analog signal feedback indicative of said sensed current;
an analog-to-digital conversion device in communication with said current sense signal limiting and amplification device, wherein said analog-to-digital conversion device being configured to convert said analog signal feedback from said current sense signal limiting and amplification device, to a digital signal feedback representative of said sensed current and output said digital signal feedback; and
a first processor in communication with said analog-to-digital conversion device to at least receive said digital signal, in which said first processor being configured to process said digital signal feedback and output control signals for said H-bridge circuit device to charge said electrolytic cell to a predetermined voltage level and maintain the electrolytic cell voltage to said predetermined voltage level, wherein at least a portion of said control signals being pulse width modulated, and wherein said first processor adjusts a duty cycle of said pulse width modulated control signals communicated to said H-bridge circuit device based on an amplitude or amperage of said digital signal feedback, and in which said adjustment of said duty cycle of said pulse width modulated control signals being operative to charge said electrolytic cell to a predetermined voltage level and maintain said electrolytic cell charge voltage to said predetermined voltage level.

9. The system as recited in claim 8, further comprising a valve system being configured to enable adjustment of a flow rate into said electrolytic cell.

10. The system as recited in claim 8, further comprising a valve system being configured to enable a flow of processed waste water back to said pump unit to be further processed.

11. The system as recited in claim 8, further comprising a driver unit being configured to control at least said pump unit.

12. The system as recited in claim 8, in which said current sense device further comprises a current sense resistor in series with a negative supply voltage of said H-bridge circuit device, and in which said apparatus further comprising a heat sink external to said circuit board for mounting said current sense resistor.

13. The system as recited in claim 8, further comprising a timer processor in communication with said first processor, in which said timer processor comprising a programmable timer, wherein said timer processor being configured to generate timing intervals for longer time period of operation, wherein said programmable timer processor is further configured to reduce long delay errors.

14. The system as recited in claim 8, further comprising an optical isolation device being configured to communicate said control signals to said H-bridge circuit device, and wherein said optical isolation device being configured to isolate a negative voltage ground and control signal of said first processor from a negative voltage ground and control signal receiver of said H-bridge circuit, wherein an output control signal level of said optical isolation device is an isolated control signal level for output to said H-bridge circuit device.

15. The system as recited in claim 8, further comprising an input-output processor being configured to at least interface said first processor with an external devices.

16. The system as recited in claim 15, in which said input-output processor is in communication with said driver unit for at least controlling said pump unit.

17. A system comprising:
a first storage tank, said first storage tank comprising at least one first storage tank being configured to retain a quantity of waste water;
a pump unit being configured to draw waste water from said first storage tank;
a driver unit being configured to control at least said pump unit;
an electrolytic cell, said electrolytic cell comprising at least one axial flow electrolytic cell in communication with said pump unit, in which said axial flow electrolytic cell comprising at least two electrodes configured to be submersed in the flow of the waste water, and wherein said electrodes being configured to accept power in an electrolysis process to at least substantially purify the waste water;
a second storage tank, said second storage tank comprising at least one second storage tank being configured to retain said processed waste water;
a first valve system being configured to enable adjustment of a flow rate of said waste water;
a second valve system being configured to enable a flow of processed waste water back to said pump unit to be further processed; and
a regulated power source being configured to supply the power to said electrolytic cell, said regulated power source at least comprising:
an H-bridge circuit device, in which said H-Bridge comprising a control signal receiver, wherein said H-bridge circuit device being configured to apply regulated power to said electrolytic cell;
a current sense device being configured to sense an amount of current flowing through said H-bridge circuit device, and in which said current sense device comprising a current sense resistor in series with a negative supply voltage of the H-bridge circuit device;
a current sense signal limiting and amplification device in communication with said current sense device, in which said current sense signal limiting and amplification device being operable for amplifying or limiting a received voltage across said current sense resistor, and wherein said current sense device producing said voltage and converting said voltage to an analog signal feedback indicative of said sensed current;
an analog-to-digital conversion device in communication with said current sense signal limiting and amplification device, and in which said analog-to-digital conversion device being configured to convert said analog signal feedback to a digital signal feedback representative of said voltage across said current sense resistor and output said digital signal feedback;
a first processor in communication with said analog-to-digital conversion device to at least receive said digital signal, wherein said first processor being configured to process said digital signal feedback and output a plurality of control signals for said H-bridge circuit device, and wherein at least a portion of said control signals being pulse width modulated, in which said first processor is configured to adjust a duty cycle of said pulse width modulated control signals based on an amplitude or amperage of said digital signal feedback, said control signals being operative to charge said electrolytic cell and maintain an electrolytic cell voltage level;
an optical isolation device, in which said optical isolation device being configured to isolate a negative voltage ground and control signal of said first processor from a negative voltage ground and control signal receiver of said H-bridge circuit, wherein an output control signal level of said optical isolation device is an isolated control signal level for output to said H-bridge circuit device;
a timer processor in communication with said first processor, wherein said timer processor being configured to generate timing intervals for longer time period of operation to reduce errors; and
an input-output processor being configured to at least interface said first processor with said driver unit for at least controlling said pump unit, and with external devices.

18. The system as recited in claim 17, further comprising a plurality of filters being configured to filter said water flow throughout the system.

19. The system as recited in claim 17, further comprising a plurality of liquid level sensors coupled to said first storage tank and said second storage tank, said liquid level sensors being in communication with said input-output processor.

20. The system as recited in claim 17, in which said first valve system and said second valve system comprise at least electrically controllable valves in communication with said driver unit.

21. The apparatus as recited in claim 1, further comprising:
a first storage tank, said first storage tank comprising at least one first storage tank being configured to retain a quantity of waste water;
a pump unit being configured to draw waste water from a storage tank; and
a driver unit being configured to control at least said pump unit.

* * * * *